United States Patent
Tsuchiya et al.

(10) Patent No.: US 12,403,821 B2
(45) Date of Patent: Sep. 2, 2025

(54) ILLUMINATION DEVICE FOR VEHICLE AND ILLUMINATION DEVICE

(71) Applicant: HONDA MOTOR CO., LTD., Tokyo (JP)

(72) Inventors: Yuji Tsuchiya, Wako (JP); Kei Oshida, Wako (JP); Masayoshi Takori, Wako (JP); Tatsuya Iwasa, Wako (JP); Haruko Okuyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 47 days.

(21) Appl. No.: 18/588,064

(22) Filed: Feb. 27, 2024

(65) Prior Publication Data

US 2024/0317133 A1  Sep. 26, 2024

(30) Foreign Application Priority Data

Mar. 17, 2023  (JP) .................. 2023-043180

(51) Int. Cl.
*B60Q 1/50* (2006.01)
*B60Q 9/00* (2006.01)

(52) U.S. Cl.
CPC .......... *B60Q 1/525* (2013.01); *B60Q 1/5037* (2022.05); *B60Q 9/008* (2013.01); *B60Q 2300/112* (2013.01); *B60Q 2300/116* (2013.01); *B60Q 2300/23* (2013.01); *B60Q 2300/42* (2013.01); *B60Q 2300/45* (2013.01)

(58) Field of Classification Search
None
See application file for complete search history.

(56) References Cited

U.S. PATENT DOCUMENTS

| | | | |
|---|---|---|---|
| 9,771,021 B1* | 9/2017 | Lindsay | B60Q 1/525 |
| 10,183,618 B2* | 1/2019 | O | B60R 16/023 |
| 10,663,978 B2* | 5/2020 | Tatara | G05D 1/0088 |
| 10,991,179 B2* | 4/2021 | Tsukamoto | B60Q 5/005 |
| 12,083,957 B2* | 9/2024 | Shibata | B60Q 1/507 |
| 2011/0211362 A1* | 9/2011 | Heiden | B60Q 1/247 362/520 |
| 2014/0036080 A1* | 2/2014 | Schut | H04N 7/18 348/148 |
| 2015/0228195 A1* | 8/2015 | Beaurepaire | B60Q 1/547 340/907 |

(Continued)

FOREIGN PATENT DOCUMENTS

WO  2018/021063  2/2018

*Primary Examiner* — Muhammad Adnan
(74) *Attorney, Agent, or Firm* — Amin, Turocy & Watson, LLP

(57) ABSTRACT

In an illumination device for a vehicle, when a recognition part has recognized that a pedestrian may be present on an advancing route and when a detection part has detected that a driver has recognized the pedestrian, an exterior light is brought into either a first lit or first not-lit state, and when the recognition part has recognized that the pedestrian may be present on the advancing route and when the detection part has detected that the driver has not recognized the pedestrian, the exterior light is brought into either a second lit or second not-lit state, and the first lit state and the second lit state are different from each other and the first not-lit state and the second not-lit state are different from each other.

8 Claims, 18 Drawing Sheets

(56) References Cited

U.S. PATENT DOCUMENTS

| | | | |
|---|---|---|---|
| 2015/0258928 A1* | 9/2015 | Goto | B60Q 1/525 |
| | | | 701/49 |
| 2017/0067609 A1* | 3/2017 | Ichikawa | F21S 43/14 |
| 2018/0072519 A1* | 3/2018 | Boston | B65G 69/2882 |
| 2019/0135306 A1* | 5/2019 | Won | G08G 1/167 |
| 2019/0168664 A1* | 6/2019 | Tatara | B60Q 1/445 |
| 2019/0268981 A1* | 8/2019 | Diep | H05B 45/20 |
| 2020/0223351 A1* | 7/2020 | Uchida | B60Q 1/525 |

\* cited by examiner

FIG. 18

| 4-WHEEL RECOGNIZES 2-WHEEL | 2-WHEEL RECOGNIZES 4-WHEEL | 4-WHEEL IS STARTED/STOPPED | 2-WHEEL IS STOPPED/NOT STOPPED | DISPLAY ON 4-WHEEL SIDE | | DISPLAY ON 2-WHEEL SIDE | |
|---|---|---|---|---|---|---|---|
| | | | | OUTWARD DISPLAY (GRILLE LIGHT) | RISK INDICATOR (INDOOR DISPLAY) | OUTWARD DISPLAY (EXTERIOR LIGHTS) | RISK INDICATOR (HELMET DISPLAY) |
| ○ | × | STARTING | NOT STOPPED | OFF→BLINKING | ○ | ON→BLINKING | ○ |
| ○ | × | STOPPED | NOT STOPPED | OFF | — | ON→BLINKING | — |
| × | ○ | STARTING | STOPPED | OFF→BLINKING | — | — | — |
| × | ○ | STARTING | NOT STOPPED | OFF→BLINKING | ○ | ON→BLINKING | ○ |
| × | × | STARTING | NOT STOPPED | OFF→BLINKING | ○ | ON→BLINKING | ○ |
| ○ | ○ | STARTING | STOPPED | OFF→BLINKING | — | — | — |
| ○ | ○ | STARTING | NOT STOPPED | OFF→BLINKING | ○ | ON→BLINKING | ○ |
| ○ | ○ | STOPPED | NOT STOPPED | OFF | — | ON→BLINKING | — |

ILLUMINATION DEVICE FOR VEHICLE AND ILLUMINATION DEVICE

CROSS-REFERENCE TO RELATED APPLICATION

Priority is claimed on Japanese Patent Application No. 2023-043180, filed Mar. 17, 2023, the content of which is incorporated herein by reference.

BACKGROUND OF THE INVENTION

Field of the Invention

The present invention relates to an illumination device for a vehicle and an illumination device.

Description of Related Art

In general, lighting bodies other than direction indicators provided on the front and the rear of a vehicle body of a vehicle are used to ensure a field of view in front of the vehicle at nighttime or notify a following vehicle of a position thereof. In recent years, in order to further ensure the safety of a vehicle or a pedestrian, a technology in which the lighting body described above has a notification function for a pedestrian or the like, in addition to a conventional role, has been proposed.

For example, an illumination device for a vehicle (vehicular illuminating system) that can indicate to a pedestrian that a vehicle traveling in an automatic driving mode has recognized the pedestrian has been proposed (for example, see PCT International Publication No. 2018/021063). The device includes a communication lamp that is visible from in front of the vehicle, and an illumination control device that changes an illumination state of the communication lamp when the vehicle detects a pedestrian.

SUMMARY OF THE INVENTION

However, in the related art as described above, although the vehicle itself reports to other object (pedestrian) whether it has recognized the other object, it is impossible to reflect whether the driver has recognized the other object. For this reason, it is not possible to communicate between the driver and the other object, and there is room for improvement in ensuring traffic safety for the vehicle and the other object.

An aspect of the present invention is directed to providing an illumination device for a vehicle and an illumination device that allow communication between a driver and other object, further improve traffic safety for the vehicle and the other object and contribute to development of a sustainable transportation system.

(1) An illumination device for a vehicle (for example, an illumination device for a vehicle (1) of an embodiment) according to the present invention includes a recognition part (for example, a recognition part (2) of the embodiment) configured to recognize other object (for example, a pedestrian (H) of the embodiment) that might be present on an advancing route of a vehicle (for example, a vehicle (100), another vehicle (102), a motorcycle (103) of the embodiment); a detection part (for example, a detection part (3) of the embodiment) configured to detect that a driver of the vehicle has recognized the other object; and an exterior light (for example, exterior lights (5), a grille light (6), state indication lights (14a, 14b) of the embodiment) provided at a position in an exterior region of the vehicle which is visible to the other object and configured to be turned on and off, and when the recognition part has recognized that there is a possibility that the other object may be present on the advancing route and when the detection part has detected that the driver has recognized other object, the exterior light is brought into either a first lit or first not-lit state, and when the recognition part has recognized that there is a possibility that the other object may be present on the advancing route and when the detection part has detected that the driver has not recognized the other object, the exterior light is brought into either a second lit or second not-lit state, and the first lit state and the second lit state are different from each other, and the first not-lit state and the second not-lit state are different from each other.

According to this configuration, it is possible to inform the other object whether the driver has recognized the other object via the exterior lights. In this way, the illumination device for a vehicle can establish communication between the driver and the other object, further improve traffic safety for the vehicle or the other object, and contribute to development of a sustainable transportation system.

(2) In the above-mentioned configuration, a plurality of exterior lights may be provided along outer edges of the vehicle, and in either the first lit or first not-lit state, a part of the exterior light may be moved according to a movement of driver's line of sight while made in a state which is different from other exterior light.

According to this configuration, the trend of the driver's line of sight can be reported to the other object in more detail. For this reason, closer communication can be established between the driver and the other object.

(3) In the above-mentioned configuration, the second lit state of the exterior lights may differ on the basis of whether the vehicle is in a traveling state or a stopped state.

According to this configuration, it is possible to warn the other object and call its attention.

(4) In the above-mentioned configuration, the illumination device for a vehicle may include a risk indicator (for example, a risk indicator (7, 105) of the embodiment) provided in a passenger compartment of the vehicle, and the risk indicator may display a risk mark (for example, a risk mark (L1, L2) of the embodiment) on a straight line connecting the driver and the other object when the recognition part has recognized the other object.

According to this configuration, it is possible to prompt the driver to recognize the other object.

(5) In the above-mentioned configuration, the exterior lights may become in the first lit state when the risk mark is present in a direction of the driver's line of sight.

According to this configuration, it is possible to more accurately establish communication between the driver and the other object.

(6) An illumination device (for example, an illumination device (50) of the embodiment) according to the present invention includes a recognition part configured to recognize other object that might be present on an advancing route of a vehicle; a detection part configured to detect that a driver of the vehicle has recognized the other object; and a light (for example, a light (50a) of the embodiment) configured to be turned on and off and radiate light to a position which is visible to the other object with respect to the vehicle, when the recognition part has recognized that there is a possibility that the other object is going to be present on the advancing route and when the detection part has detected that the driver has recognized the other object, the light radiates light in a first lit state, when the recognition part has recognized that there is a possibility that the other object is going to be present on the advancing route and when the detection part has detected that the driver has not recognize the other object, the light radiates light in a second lit state, and the first lit state and the second lit state are different from each other.

According to this configuration, communication can be established between the driver and the other object without providing the light on the vehicle itself. For example, by setting the light on the line of sight of the other object at the intersection, it is possible to inform the other object of the recognition state of the driver. In this way, the illumination device can establish communication between the driver and the other object, further improve traffic safety for the vehicle or the other object, and contribute to development of a sustainable transportation system.

(7) In the above-mentioned configuration, the light may radiate light to a road surface at a position (for example, a point (P) of the embodiment) where the vehicle and the other object will cross each other.

According to this configuration, it is possible to reliably notify the driver's recognition state to the other object.

(8) In the above-mentioned configuration, the light may radiate light to a position where the other object can visually recognize in an exterior region of the vehicle.

According to this configuration, communication can be established between the driver and the other object without providing the exterior lights on the vehicle itself.

According to the aspect of the present invention, the illumination device for a vehicle and the illumination device can establish communication between the driver and the other object, further improve traffic safety for the vehicle or the other object, and contribute to development of a sustainable transportation system.

BRIEF DESCRIPTION OF THE DRAWINGS

FIG. 18 is a table showing display timings of lights of a vehicle or a motorcycle in the embodiment of the present invention.

DETAILED DESCRIPTION OF THE INVENTION

Next, an embodiment of the present invention will be described with reference to the accompanying drawings.
<Vehicular Illumination Device>

Figure 1:
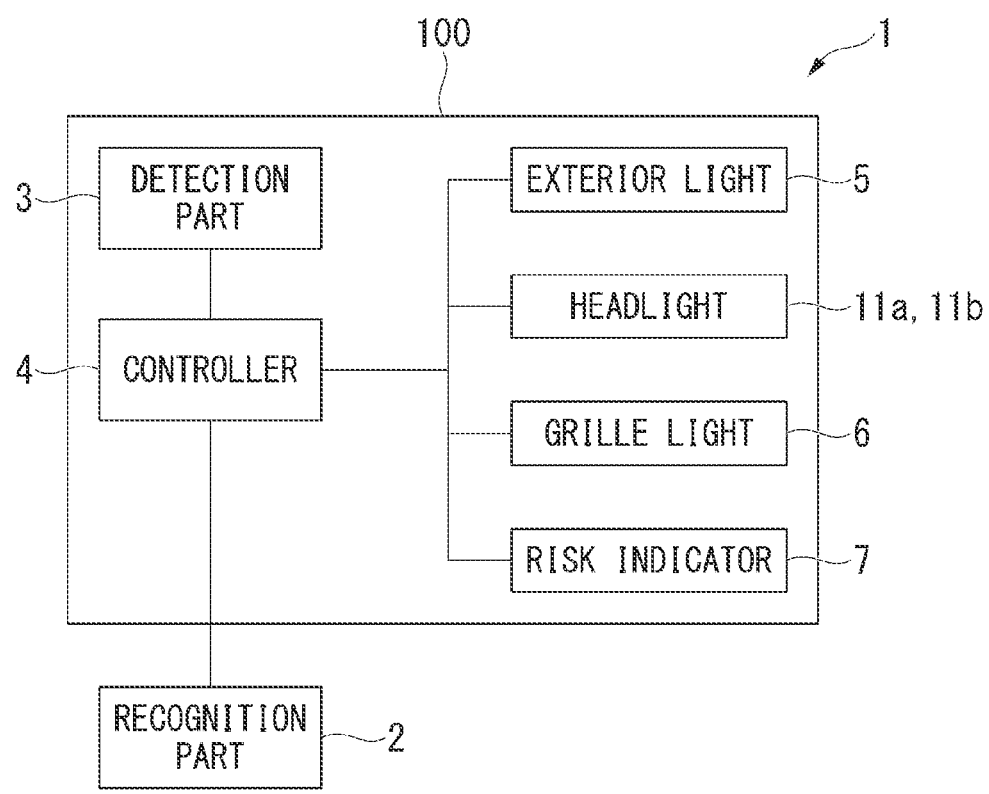
FIG. 1 is a block diagram of an illumination device for a vehicle according to an embodiment of the present invention.
Figure 2:
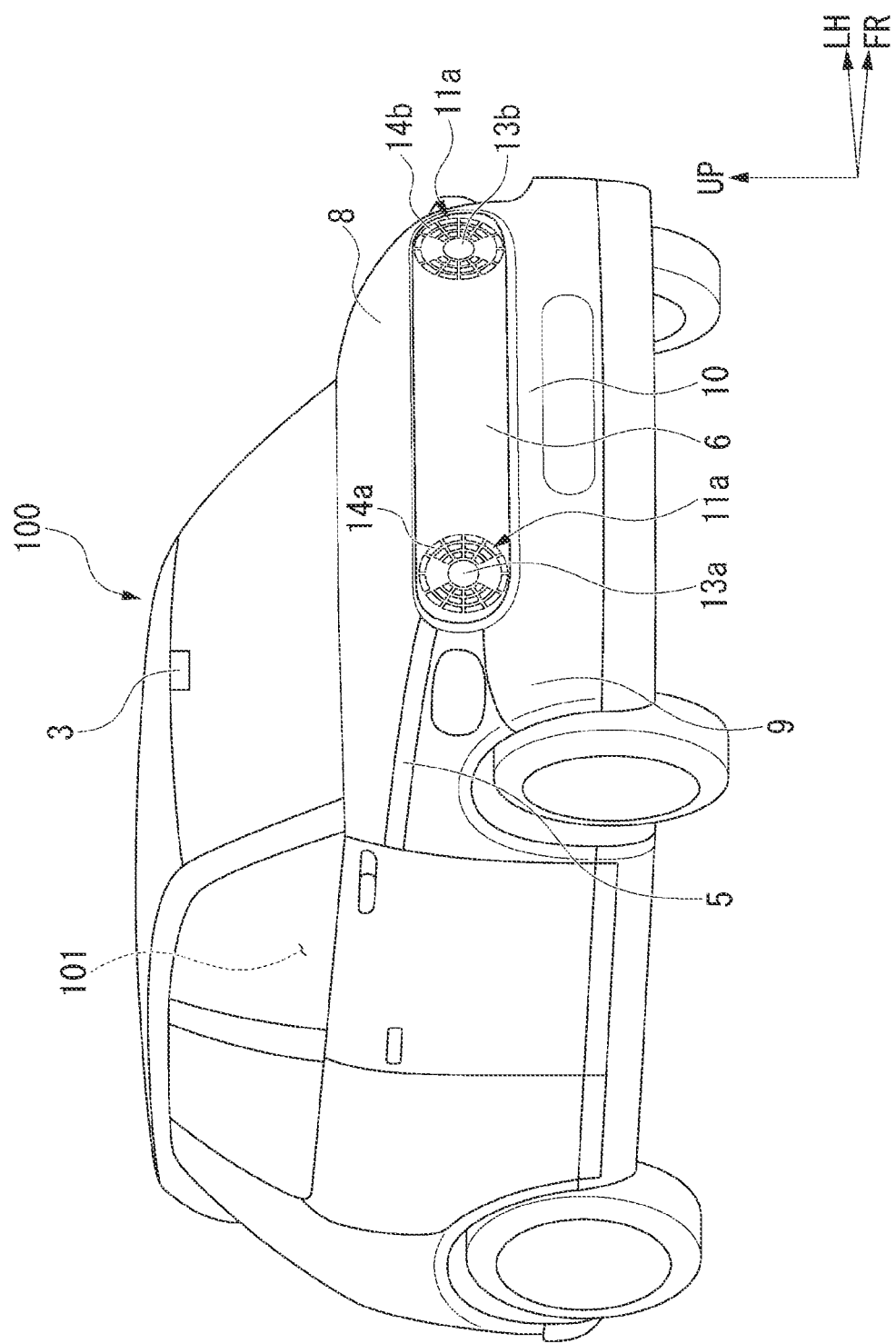
FIG. 2 is a perspective view of a vehicle according to the embodiment of the present invention.

FIG. 1 is a block diagram of an illumination device for a vehicle 1. FIG. 2 is a perspective view of a vehicle 100 (host vehicle) on which the illumination device for a vehicle 1 is mounted.

The illumination device for a vehicle 1 is a device configured to perform communication between a driver of the vehicle 100 and other vehicles (four-wheeled vehicle or motorcycle) 102 and 103 (see FIG. 5) or a pedestrian H (see FIG. 9) using a communication technology for a vehicle such as V2X (vehicle-to-everything) or the like. In the following drawings, in order to make directions easier to understand, the front of the vehicle 100 is indicated by an arrow FR as necessary. A side above the vehicle 100 is indicated by an arrow UP. A left side of the vehicle 100 when directed forward is indicated by an arrow LH.

As shown in FIG. 1 and FIG. 2, the illumination device for a vehicle 1 includes, for example, a recognition part 2 configured to recognize the other vehicles 102 and 103 or the pedestrian H entering an intersection I (see FIG. 5) or the like, a detection part 3 provided on the vehicle 100, a controller 4, exterior lights 5, headlights 11a and 11b, a grille light 6, and a risk indicator 7.

The recognition part 2 may be a unit that can recognize the other vehicles 102 and 103 or the pedestrian H through satellite communication or terrestrial communication, and for example, the recognition part 2 performs communication with a portable terminal of the pedestrian H, communication with a positional information sensor provided on the vehicle, or communication with the pedestrian H or the other vehicles 102 and 103, and recognizes positions of the pedestrian H or the other vehicles 102 and 103. In addition, the recognition part 2 may be provided on the vehicle 100, and, for example, the recognition part 2 may recognize positions of the pedestrian H or the other vehicles 102 and 103 on the basis of pictures or information acquired by an on-vehicle camera configured to capture an image outside the vehicle or on-vehicle millimeter-wave radar or an on-vehicle infrared sensor configured to acquire information from outside the vehicle. The information recognized by the recognition part 2 is output to the controller 4 of the vehicle 100 as a signal.

In addition, when the pedestrian H is present in front of the vehicle 100, the recognition part 2 can also detect the line of sight and a pupil status of the pedestrian H using an on-vehicle camera or an on-vehicle infrared sensor. For example, in detection of the line of sight of the pedestrian H, a cornea reflection method of reflecting infrared light with the cornea of the pedestrian H and detecting a direction of a user's line of sight, a limbus tracking method using a difference in reflectance with respect to lights between the cornea and the sclera, an image analysis method of imaging a picture on the eyeball with a camera and detecting the line of sight through image processing, or the like, may be used.

The detection part 3 of the vehicle 100 is provided in a passenger compartment 101 of the vehicle 100. The detection part 3 detects a line of sight, the pupil, sweating, a heart rate, and the like, of a driver (not shown).

For example, in detection of the driver's line of sight, a cornea reflection method of reflecting infrared light with the cornea of the driver and detecting a direction of a user's line of sight, a limbus tracking method using a difference in reflectance with respect to lights between the cornea and the sclera, an image analysis method of imaging a picture on the eyeball with a camera and detecting the line of sight through image processing, or the like, may be used. The information detected by the detection part 3 is output to the controller 4 as a signal.

For example, when the sweating and the heart rate of the driver are detected, a sensor may be provided on a handle, or a sensor that can be attached to the driver's wrist or the like may be used. The sweating and the heart rate of the driver are detected using these sensors.

The controller 4 determines various situations on the basis of the signals input from the recognition part 2 and the detection part 3 or a driving situation of the vehicle 100. The controller 4 performs operation control of the exterior lights 5, the headlights 11a and 11b, the grille light 6, and the risk indicator 7 according to the situations.

The exterior lights 5 are provided at positions in an exterior region (vehicle body surface) of the vehicle 100 where the pedestrian H can recognize on left and right sides of a front portion thereof. Specifically, the plurality of exterior lights 5 are provided along boundaries between a bonnet hood 8 and front fenders 9. In other words, the plurality of exterior lights 5 are provided along outer edges of the vehicle 100. The operations of the exterior lights 5 are controlled by the controller 4 to change a lighting state according to a situation (details will be described below).

The headlights 11a and 11b are disposed on both sides of the front portion of the vehicle 100 in a vehicle width direction. The headlights 11a and 11b are constituted by headlight main bodies 13a and 13b, and a plurality of state indication lights 14a and 14b that surround the headlight main bodies 13a and 13b, respectively. The headlight main bodies 13a and 13b are lights that radiate forward at nighttime or the like. The plurality of state indication lights 14a and 14b are disposed in annular shapes seen from the front. The state indication lights 14a and 14b function as direction indicators, and further, operations thereof are controlled by the controller 4 to change a display method according to a situation (details will be described below).

The grille light 6 is provided on a front grill 10 that configures the front portion of the vehicle 100. A plurality of grille lights 6 are provided in a predetermined region between the left and right headlights 11a and 11b that is elongated in the vehicle width direction. For this reason, a plurality of display methods can be employed as lighting display methods of the grille light 6. Operations of the grille light 6 are controlled by the controller 4 to change a display method according to a situation (details will be described below).

Figure 3:
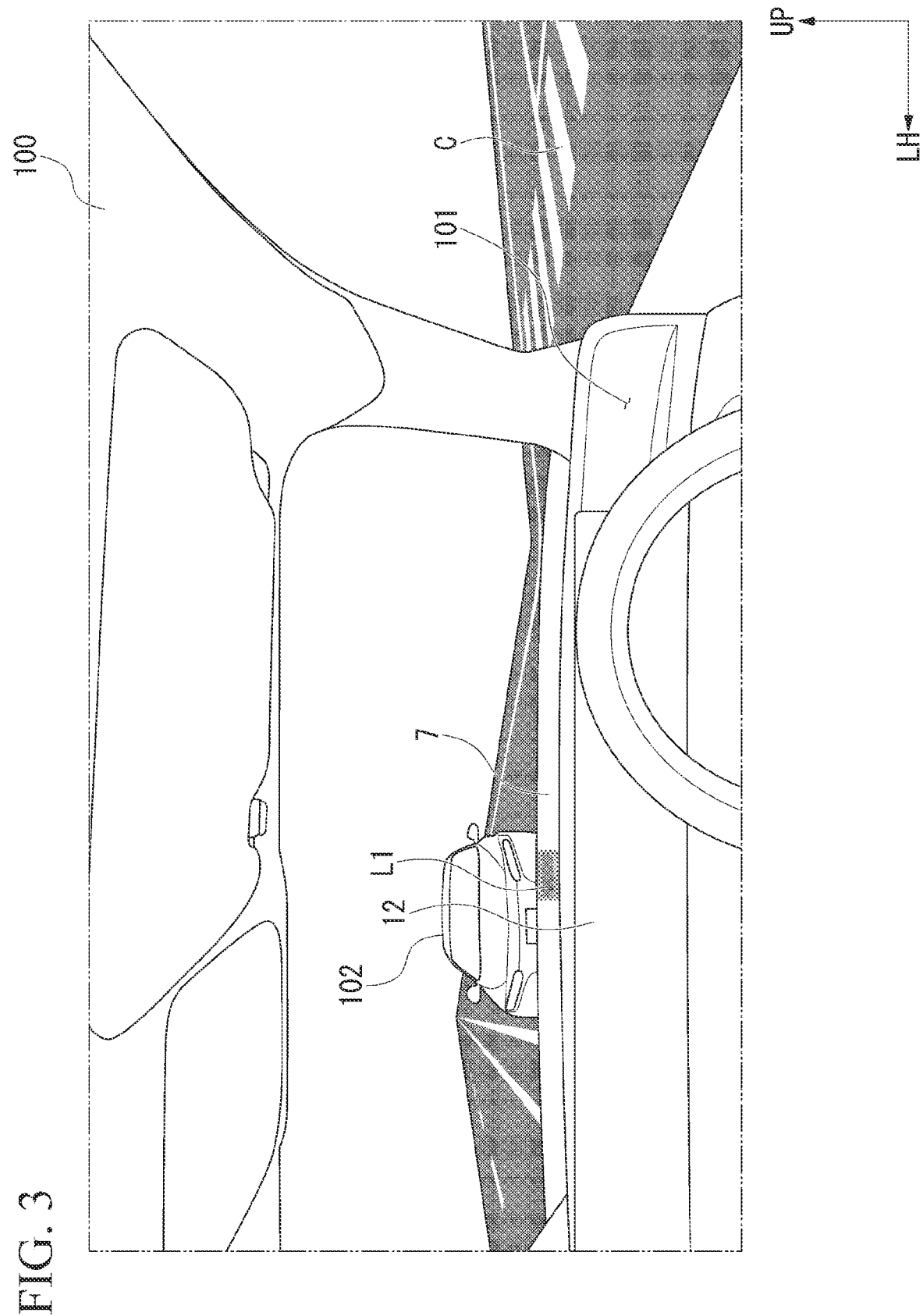
FIG. 3 is a perspective view showing a forward side seen from a driver's seat of a passenger compartment according to the embodiment of the present invention.

FIG. 3 is a perspective view in which a forward side is seen from a driver's seat of the passenger compartment 101. While details will be described below, FIG. 3 shows a state in which the vehicle 100 enters the intersection I, which will be described below.

As shown in FIG. 3, the risk indicator 7 is provided lengthily on a dashboard 12 in the vehicle width direction. Operations of the risk indicator 7 are controlled by the controller 4 to change a lighting state according to a situation (details will be described below).

<Operations of Illumination Device for Vehicle>

Next, operations of the illumination device for a vehicle 1 will be described.

First, operations of the grille light 6 will be described.

<Operations of Grille Light>

Figure 4:
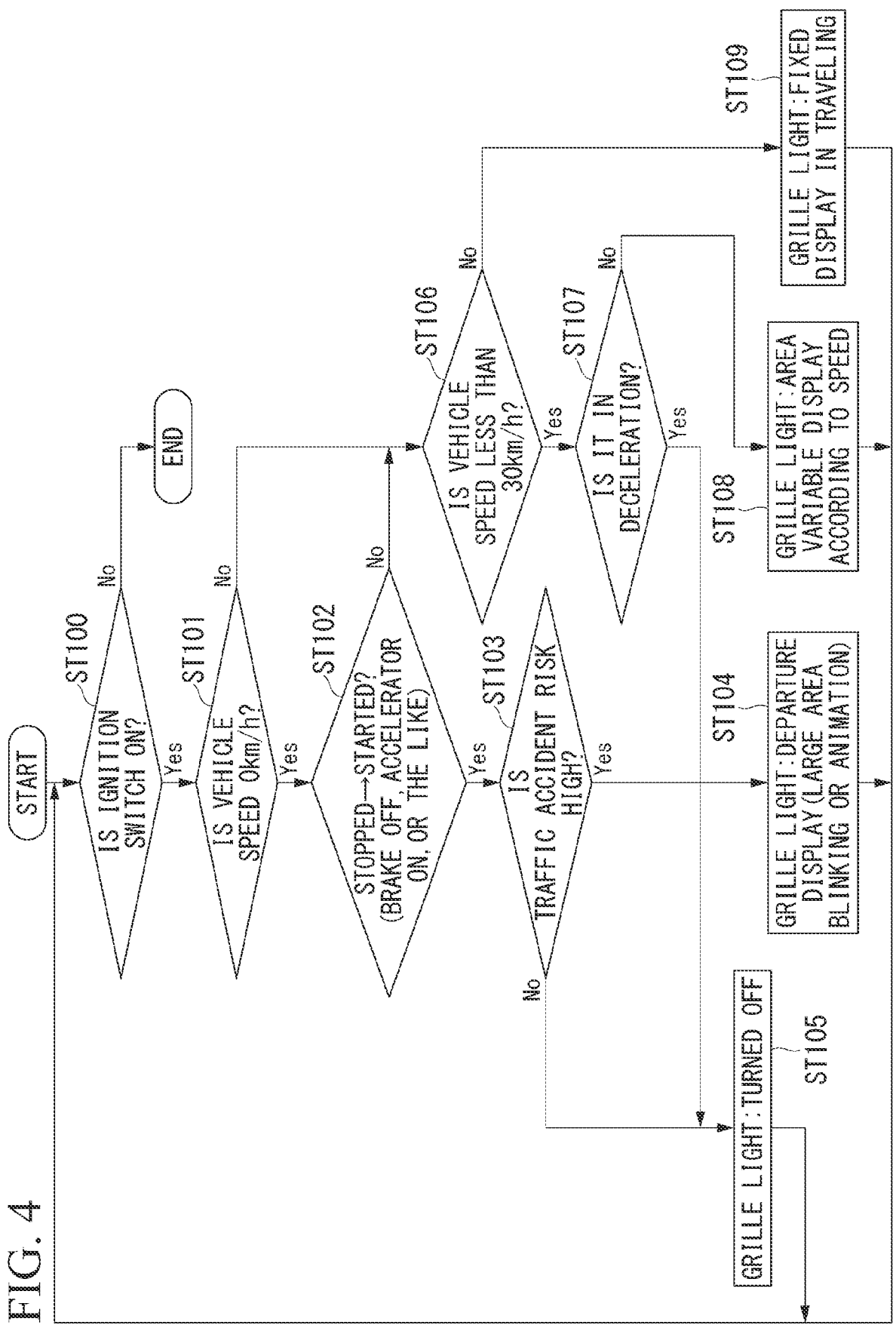
FIG. 4 is a flowchart for describing an operation of a grille light according to the embodiment of the present invention.

FIG. 4 is a flowchart for describing operation control of the grille light 6.

As shown in FIG. 4, first, the controller 4 performs determination of whether an ignition switch (not shown) of the vehicle 100 is turned on (step ST100).

When determination in step ST100 is "No," i.e., the ignition switch is turned off, the operation of the grille light 6 is terminated.

Meanwhile, when determination in step ST100 is "Yes," i.e., the ignition switch is turned on, the controller 4 performs determination of whether a vehicle speed of the vehicle 100 is 0 [km/h], i.e., whether the vehicle 100 is stopped (step ST101).

When determination in step ST101 is "Yes," i.e., the vehicle 100 is stopped, the controller 4 performs determination of whether the vehicle 100 has started (step ST102). Determination in step ST102 is performed by whether the driver has took his/her foot off the brake or stepped on the accelerator.

When determination in step ST102 is "Yes," i.e., the vehicle 100 has started, the controller 4 performs determination of whether a traffic accident risk is high (step ST103).

Here, a method of determining whether a traffic accident risk is high will be described.

Figure 5:
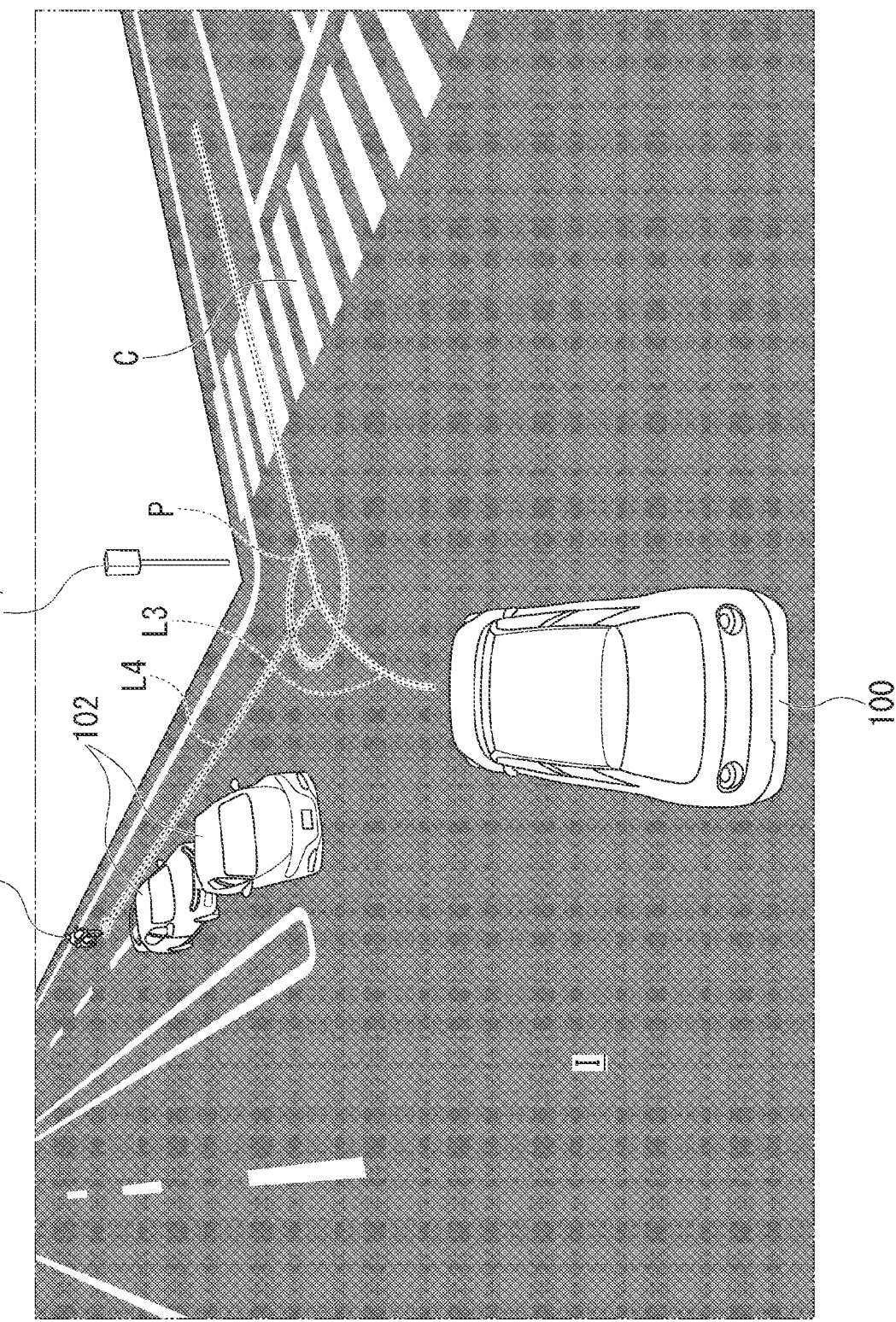
FIG. 5 is a perspective view showing an aspect of the vehicle on an intersection in the embodiment of the present invention.

FIG. 5 is a perspective view showing, for example, an aspect of the vehicle 100 that is to turn right at the intersection I.

As shown in FIG. 5, it is supposed that the vehicle 100 is about to turn right at the intersection I, and a plurality of (in FIG. 5, two) other vehicles (four-wheeled vehicles) 102 are stationary in front of the vehicle. In addition, it is supposed that vehicles (for example, a motorcycle, hereinafter, referred to as a motorcycle) 103 other than the vehicle are traveling in front of the vehicle 100 toward the intersection I while being hidden behind the other vehicle 102. In such a case, if the vehicle 100 or the motorcycle 103 proceeds without recognizing each other, there is a possibility of a collision at the intersection I (see a point P in FIG. 5).

Incidentally, in such a situation, positional information of the motorcycle 103 recognized by the recognition part 2 is output to the controller 4 of the vehicle 100 as a signal. The controller 4 lights a risk mark L1 on a part of the risk indicator 7 as shown in FIG. 3 on the basis of the signal output from the recognition part 2 (an indicator lighting state). The risk mark L1 is on a straight line connecting the driver and the motorcycle 103. At the time shown in FIG. 3, the driver is in a blind spot due to the other vehicle 102 and cannot directly see the motorcycle 103.

Meanwhile, at this time, the driver's line of sight is detected by the detection part 3. The detection result is output to the controller 4 as a signal. The controller 4 performs determination of whether the driver's line of sight detected by the detection part 3 is directed toward the risk mark L1 according to the indicator lighting state. When the driver's line of sight is directed toward the risk mark L1 according to the indicator lighting state, it is determined by the controller 4 that the driver has recognized (visually recognized) the motorcycle 103. In this case, it is determined that the driver has recognized the motorcycle 103 and a traffic accident risk is low.

Figure 6:
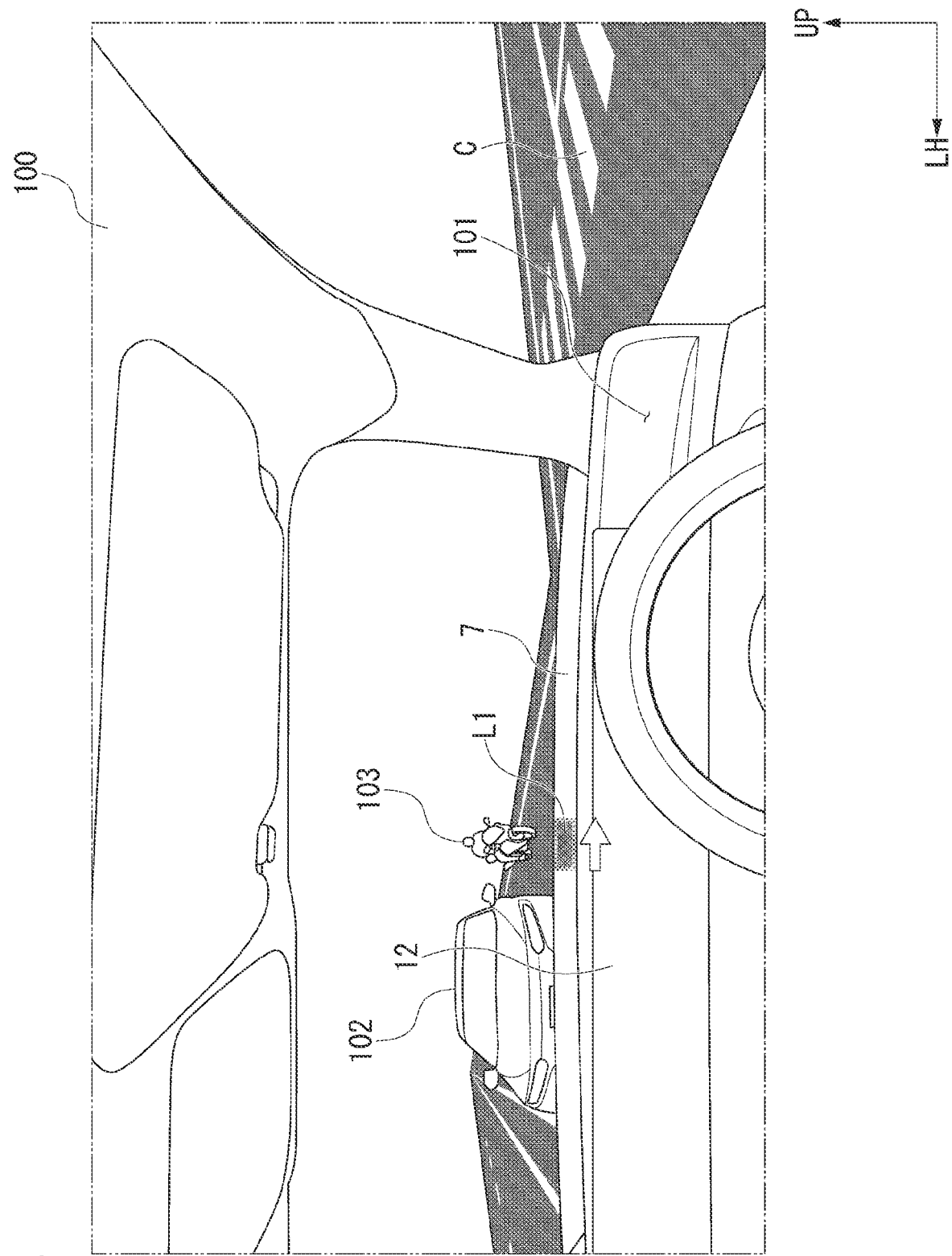
FIG. 6 is a perspective view showing a forward side seen from the passenger compartment of the vehicle on the intersection in the embodiment of the present invention.

FIG. 6 is a perspective view in which a forward side is seen from a driver's seat of the passenger compartment 101 in a state in which the vehicle 100 enters the intersection I. FIG. 6 corresponds to FIG. 3, and shows a state in which time has advanced slightly since the time of FIG. 3.

As shown in FIG. 6, when the motorcycle 103 continues to progress, the risk mark L1 according to the indicator lighting state also moves. That is, the risk mark L1 is always on the straight line connecting the driver and the motorcycle 103. When it is determined that the driver's line of sight is moved according to movement of the risk mark L1, it is determined that the traffic accident risk continues to be low.

On the other hand, when the driver's line of sight is not directed toward the risk mark L1, it is determined by the controller 4 that the driver does not visually recognize the motorcycle 103. In this case, it is determined that the driver does not recognize the motorcycle 103 and the traffic accident risk is high.

Further, determination of whether the driver has recognized the motorcycle 103 is not limited to determination of whether the driver's line of sight is directed toward the risk mark L1. Determination of whether the driver has recognized the motorcycle 103 may be performed on the basis of the pupil, the sweating state, the heart rate, or the like, of the driver detected by the detection part 3.

Returning to FIG. 4, when determination in step ST103 is "Yes," i.e., it is determined that the traffic accident risk is high, the grille light 6 is lit. The lighting display method at this time becomes a departure display (step ST104). After that, the controller 4 performs determination of step ST100 again. An example of a lighting display of the grille light 6 will be described below.

Meanwhile, when determination in step ST103 is "No," i.e., it is determined that the traffic accident risk is low, the grille light 6 is turned off (step ST105). After that, the controller 4 performs determination of step ST100 again.

Meanwhile, when determination in step ST101 is "No," i.e., the vehicle 100 is traveling, or when determination in step ST102 is "No," i.e., the vehicle 100 is still stopped, the controller 4 performs determination of whether a vehicle speed of the vehicle 100 is less than 30 [km/h] (step ST106).

When determination in step ST106 is "Yes," i.e., a vehicle speed is less than 30 [km/h], the controller 4 performs determination of whether the vehicle 100 is in deceleration (step ST107).

When determination in step ST107 is "Yes," i.e., the vehicle 100 is in deceleration, the grille light 6 is turned off (step ST105).

Meanwhile, when determination in step ST107 is "No," i.e., the vehicle 100 is not decelerated, the grille light 6 is turned on. The lighting display method at this time becomes an area variable display that changes a display area of the grille light 6 on the basis of the vehicle speed (step ST108). After that, the controller 4 performs determination of step ST100 again. An example of the area variable display of the grille light 6 will be described below.

Meanwhile, when determination in step ST106 is "No," i.e., the vehicle speed is 30 [km/h] or more, the grille light 6 is turned on. The lighting display method at this time becomes a fixed display in traveling (step ST109). After that, the controller 4 performs determination of step ST100 again.

<Example of Display Method of Grille Light>

Next, an example of the display method of the grille light 6 will be described with reference to FIG. 7.

Figure 7:
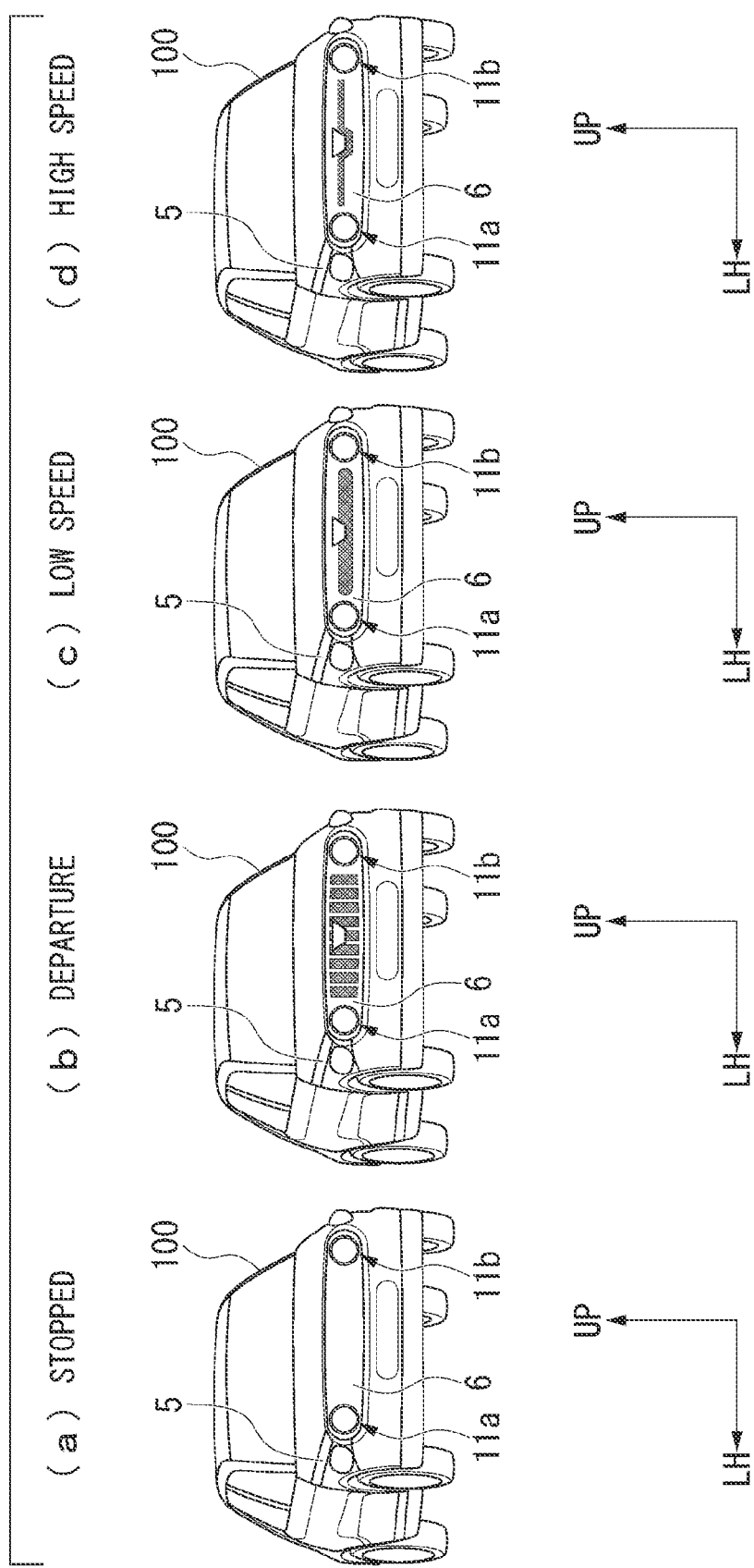
FIG. 7 is a view for describing an example of a display method of a grille light in the embodiment of the present invention, and FIGS. 7(a) to 7(d) showing displays according to situations.

FIG. 7 is a view for describing an example of the display method of the grille light 6, parts (a) to (d) showing displays according to states.

For example, part (a) of FIG. 7 shows a state in which the grille light 6 is turned off. On the other hand, as shown in part (b) of FIG. 7, when the lighting display method of the grille light 6 becomes a departure display, the entire display area of the grille light 6 is turned on. In this case, the grille light 6 may be blinked or animated.

For example, as shown in a part (c) of FIG. 7, when the lighting display method of the grille light 6 becomes an area variable display, a display area of the grille light 6 is reduced in low speed traveling. On the other hand, for example, as shown in a part (c) of FIG. 7(c), in high speed traveling in the area variable display, the display area of the grille light 6 becomes larger than in the case of the low speed traveling.

A lighting color of the grille light 6 is, for example, white. However, there is no limitation thereto, but the lighting color may be various colors.

<Operations of Exterior Lights, Grille Light and Headlights>

Figure 8:
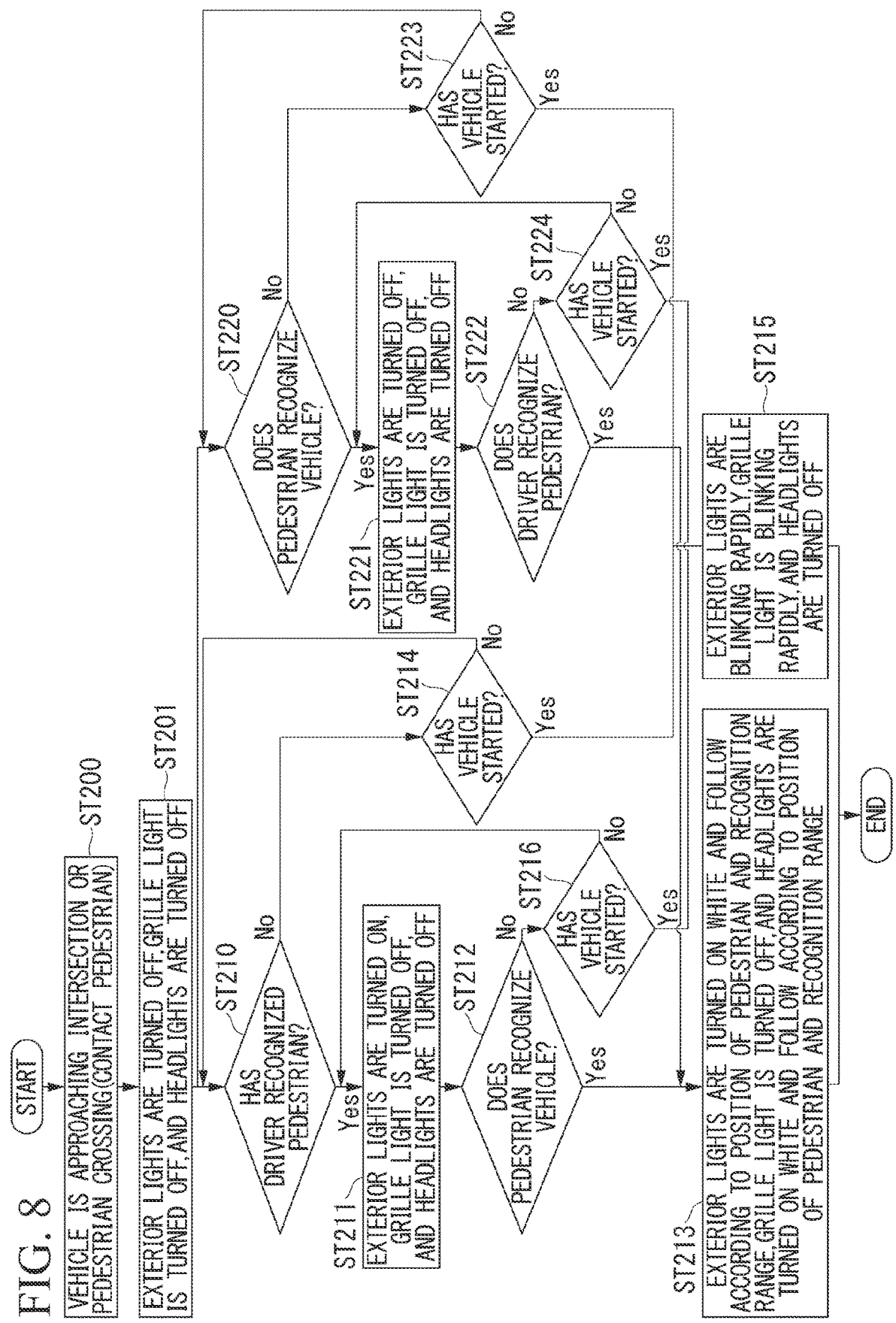
FIG. 8 is a flowchart for describing operation control of exterior lights, grille lights and headlights in the embodiment of the present invention.

Next, operations of all the exterior lights 5, the grille light 6 and the headlights 11a and 11b will be described. Hereinafter, as an example, as shown in FIG. 5, it is assumed that the vehicle 100 entering the intersection I starts to turn right, and approaches a pedestrian crossing C to cross the pedestrian crossing C. FIG. 8 is a flowchart for describing operation control of the entire lights (the exterior lights 5, the grille light 6 and the headlights 11a and 11b).

As shown in FIG. 8, when the vehicle 100 approaches pedestrian crossing C (step ST200), the exterior lights 5, the grille light 6 and the headlights 11a and 11b are turned off at this time (step ST201).

Next, the controller 4 performs determination of whether the driver has recognized the pedestrian H (step ST210), and simultaneously, performs determination whether the pedestrian H has recognized the vehicle 100 (step ST220).

Here, a method of determining whether the driver has recognized the pedestrian H and a method of determining whether the pedestrian H has recognized the vehicle 100 will be described.

First, the method of determining whether the driver has recognized the pedestrian H will be described.

Figure 9:
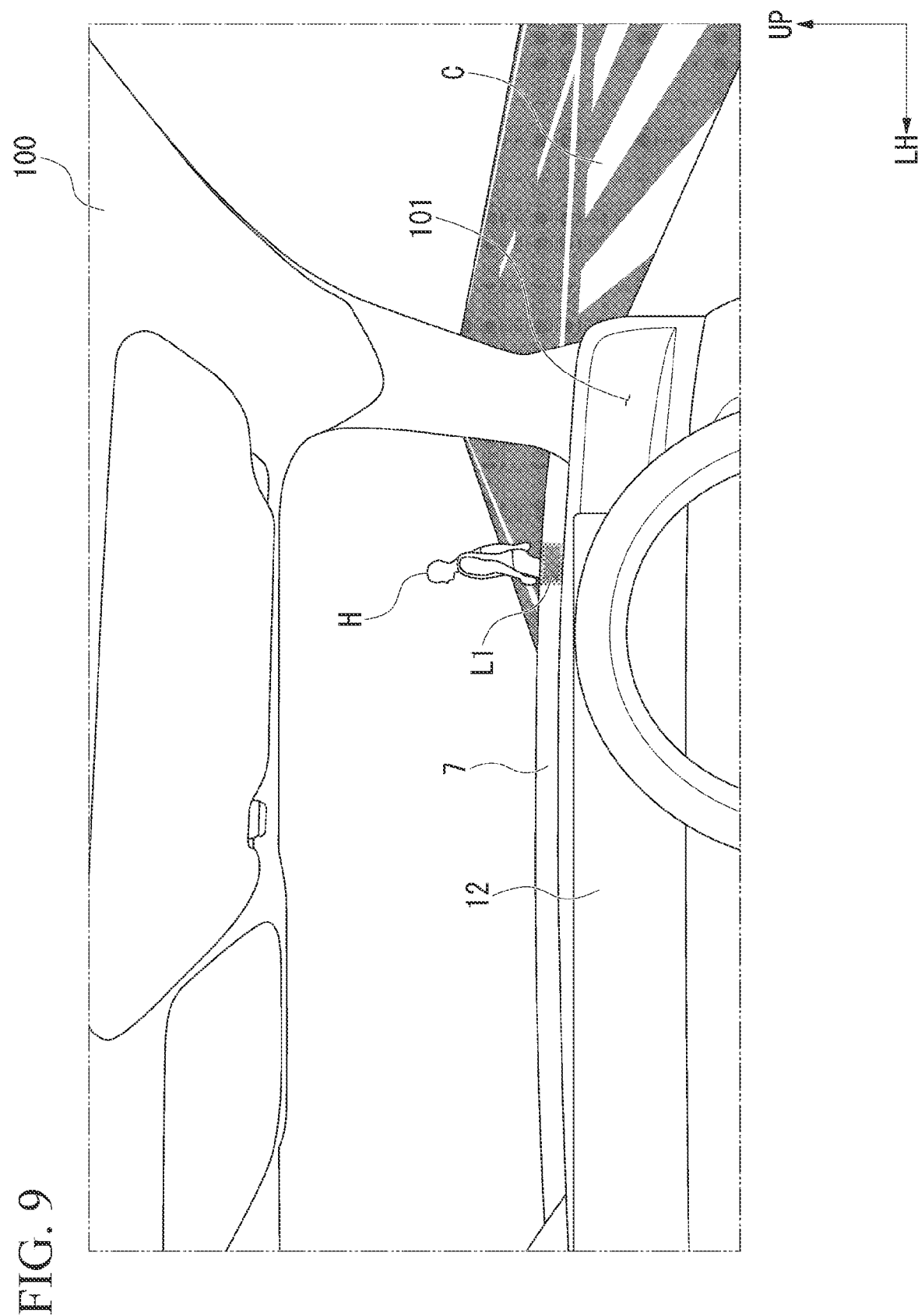
FIG. 9 is a perspective view showing a forward side seen from the passenger compartment of the vehicle on a pedestrian crossing in the embodiment of the present invention.

FIG. 9 is a perspective view in which a forward side is seen from the driver's seat of the passenger compartment 101 in a state in which the vehicle 100 approaches the pedestrian crossing C. FIG. 9 corresponds to FIG. 3 and FIG. 6, and shows a state in which a predetermined amount of time has passed since the point in FIG. 6.

The method of determining whether the driver has recognized the pedestrian H is basically the same method of determining whether the above-mentioned traffic accident risk is high.

That is, as shown in FIG. 9, positional information of the pedestrian H recognized by the recognition part 2 is output to the controller 4 of the vehicle 100 as a signal. The controller 4 turns on the risk mark L1 on a part of the risk indicator 7 on the basis of the signal output from the recognition part 2 (an indicator lighting state). The risk mark L1 is on the straight line connecting the driver and the pedestrian H.

At this time, the detection part 3 detects the driver's line of sight. The detection result is output to the controller 4 as a signal. The controller 4 performs determination of whether the driver's line of sight detected by the detection part 3 is directed toward the risk mark L1 according to the indicator lighting state. When the driver's line of sight is directed toward the risk mark L1 according to the indicator lighting state, it is determined by the controller 4 that the driver has recognized (visually recognized) the pedestrian H.

On the other hand, when the driver's line of sight is not directed toward the risk mark L1, it is determined by the controller 4 that the driver does not recognize the pedestrian H. Further, the determination of whether the driver has recognized the pedestrian H is not limited to the determination of whether the driver's line of sight is directed toward the risk mark L1. Determination of whether the driver has recognized the pedestrian H may be performed on the basis of the pupil, the sweating state, and the heart rate of the driver detected by the detection part 3.

Next, the method of determining whether the pedestrian H has recognized the vehicle 100 will be described.

In this case, the line of sight of the pedestrian H is detected by the detection part 3. When the line of sight of the pedestrian H is directed toward the vehicle 100, it is determined by the controller 4 that the pedestrian H has recognized the vehicle 100. On the other hand, when the line of sight of the pedestrian H is not directed toward the vehicle 100, it is determined by the controller 4 that the pedestrian H does not recognize the vehicle 100.

Further, the determination of whether the pedestrian H has recognized the vehicle 100 is not limited to the case in which the line of sight of the pedestrian H is detected by the detection part 3. The line of sight of the pedestrian H may be detected by the recognition part 2.

Returning to FIG. 8, when determination in step ST210 is "Yes," i.e., the driver has recognized the pedestrian H, all the exterior lights 5 are turned on (step ST211; hereinafter, may be referred to as first lighting). At this time, the grille light 6 and the headlights 11a and 11b are turned off. A lighting color of the exterior lights 5 is, for example, green. However, there is not limitation thereto, and the lighting color of the exterior lights 5 may be various colors.

Next, the controller 4 performs determination of whether the pedestrian H has recognized the vehicle 100 (step ST212).

When determination in step ST212 is "Yes," i.e., the pedestrian H has recognized the vehicle 100, the controller 4 determines that the driver and the pedestrian H recognize each other. Then, a part of the exterior lights 5 move according to the movement of the driver's line of sight while having a different lighting state from the other exterior lights 5. In other words, a part of the exterior lights 5 move according to the position and the recognition range of the pedestrian H while having a different lighting state from the other exterior lights 5 (step ST213).

Here, the headlights 11a and 11b also move according to movement of the driver's line of sight. In other words, the headlights 11a and 11b are turned on according to the position and the recognition range of the pedestrian H. The grille light 6 remains off.

<Example of Method of Displaying Exterior Lights and Headlights>

Next, an example of the method of displaying the exterior lights 5 and the headlights 11a and 11b in step ST213 will be described with reference to FIG. 10 to FIG. 13.

FIG. 10 to FIG. 13 are views for describing an example of the method of displaying the exterior lights 5 and the headlights 11a and 11b of each state. FIG. 10 to FIG. 13 correspond to FIG. 2. Hereinafter, when the vehicle 100 turns right and crosses the pedestrian crossing C as an example, the following description assumes that the pedestrian H crosses the pedestrian crossing C from the right to the left in a direction of advance of the vehicle 100. In other words, it is assumed that the pedestrian H is about to enter the progress route of the vehicle 100. FIG. 10 to FIG. 13 show these situations sequentially over time.

Figure 10:
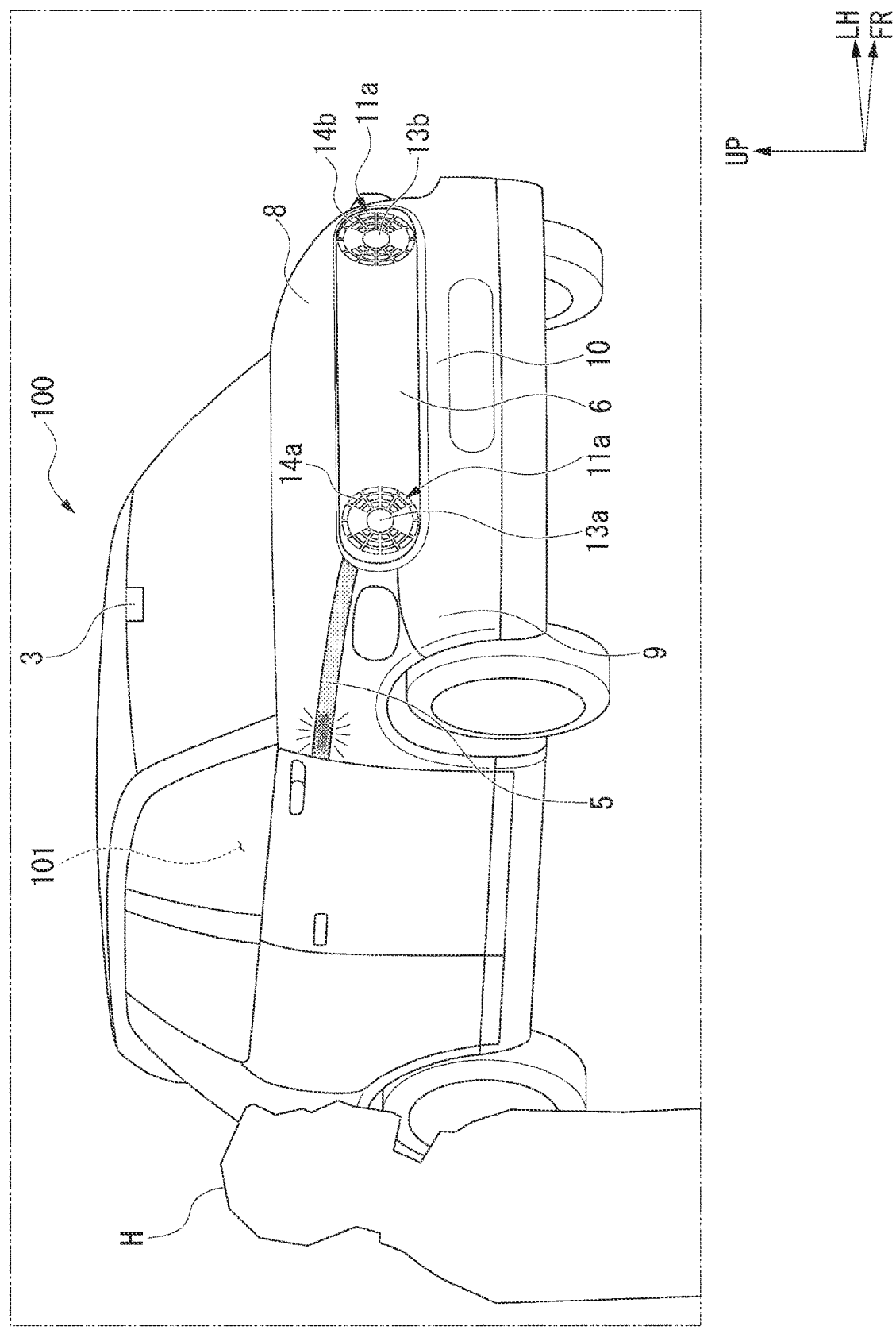
FIG. 10 is a view for describing an example of a display method of the exterior lights and the headlights in the embodiment of the present invention.

As shown in FIG. 10, when the pedestrian H is walking to the right front of the vehicle 100 and the driver's line of sight is directed toward the pedestrian H, a part of the plurality of exterior lights 5 corresponding to the driver's line of sight are turned on with a lighting color different from the other exterior lights 5. For example, while all the exterior lights 5 are turned on green in a first lit state of step ST211, a part of the exterior lights 5 are turned on white in step ST213. At this time, a part of the exterior lights 5 are turned on white among the entire of the exterior lights 5, for example.

Figure 11:
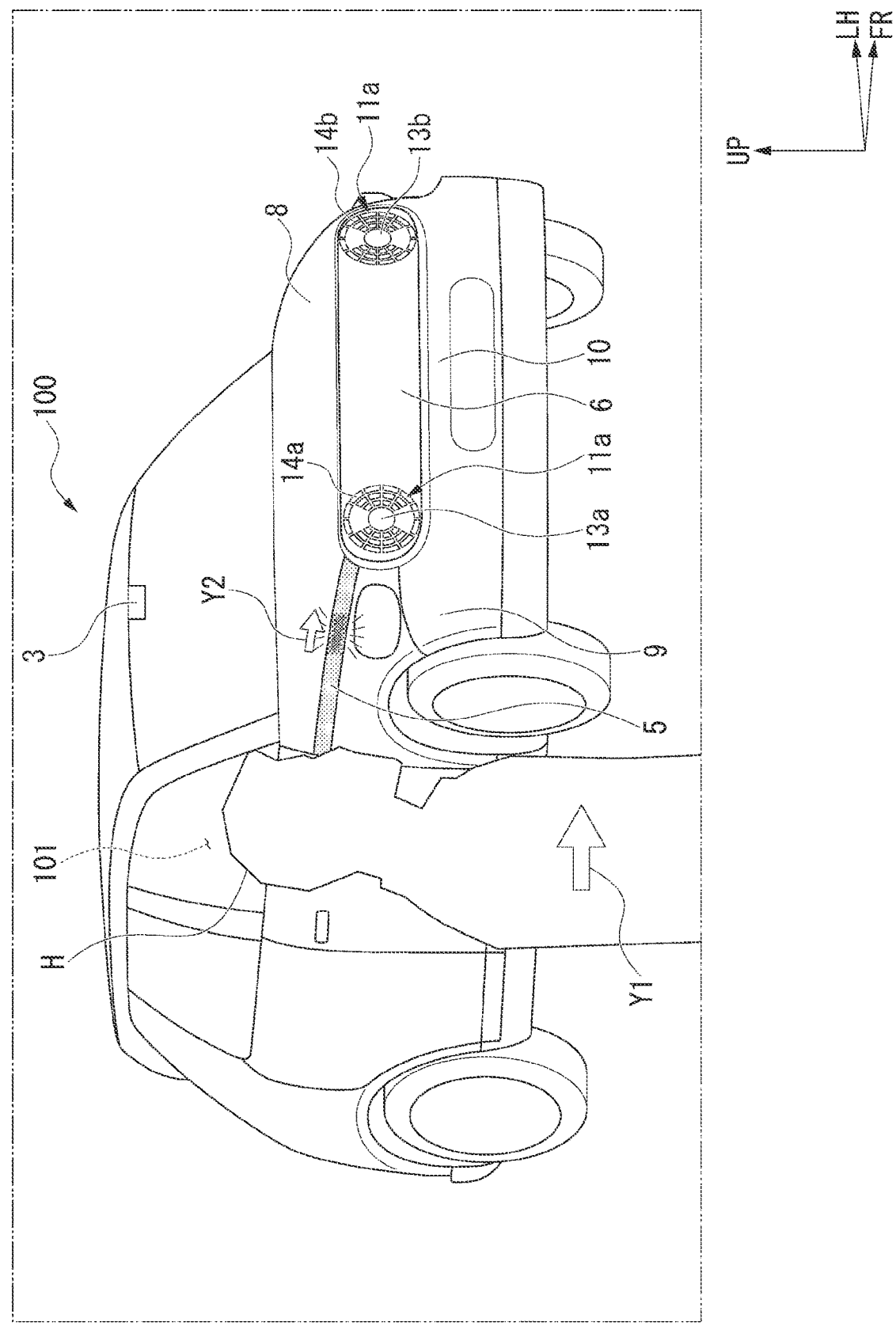
FIG. 11 is a view for describing an example of the display method of the exterior lights and the headlights in the embodiment of the present invention.

Next, as shown in FIG. 11, when the pedestrian H walks forward and the pedestrian H moves in front of the vehicle 100 (see an arrow Y1 in FIG. 11), the driver's line of sight is moved to follow the pedestrian H. Then, some of the exterior lights 5 (for example, a place turned on white) move forward little by little according to thereto (see an arrow Y2 in FIG. 11).

Figure 12:
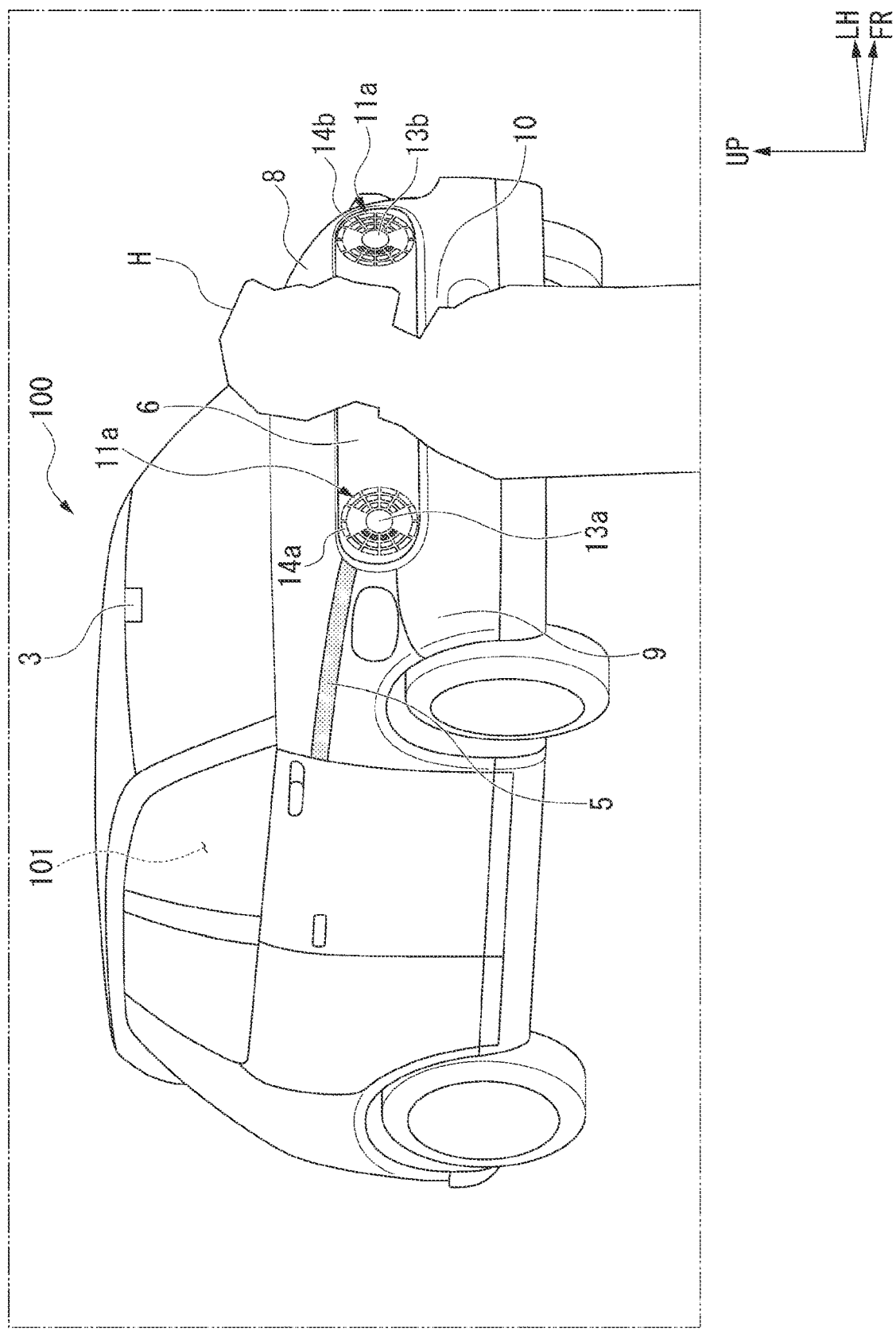
FIG. 12 is a view for describing an example of the display method of the exterior lights and the headlights in the embodiment of the present invention.

Next, as shown in FIG. 12, the pedestrian H further walks forward, and the pedestrian H is about to cross in front of the vehicle 100. Here, among the plurality of state indication lights 14a and 14b of the headlights 11a and 11b, some of the lights on the right side corresponding to the driver's line of sight are turned on.

Figure 13:
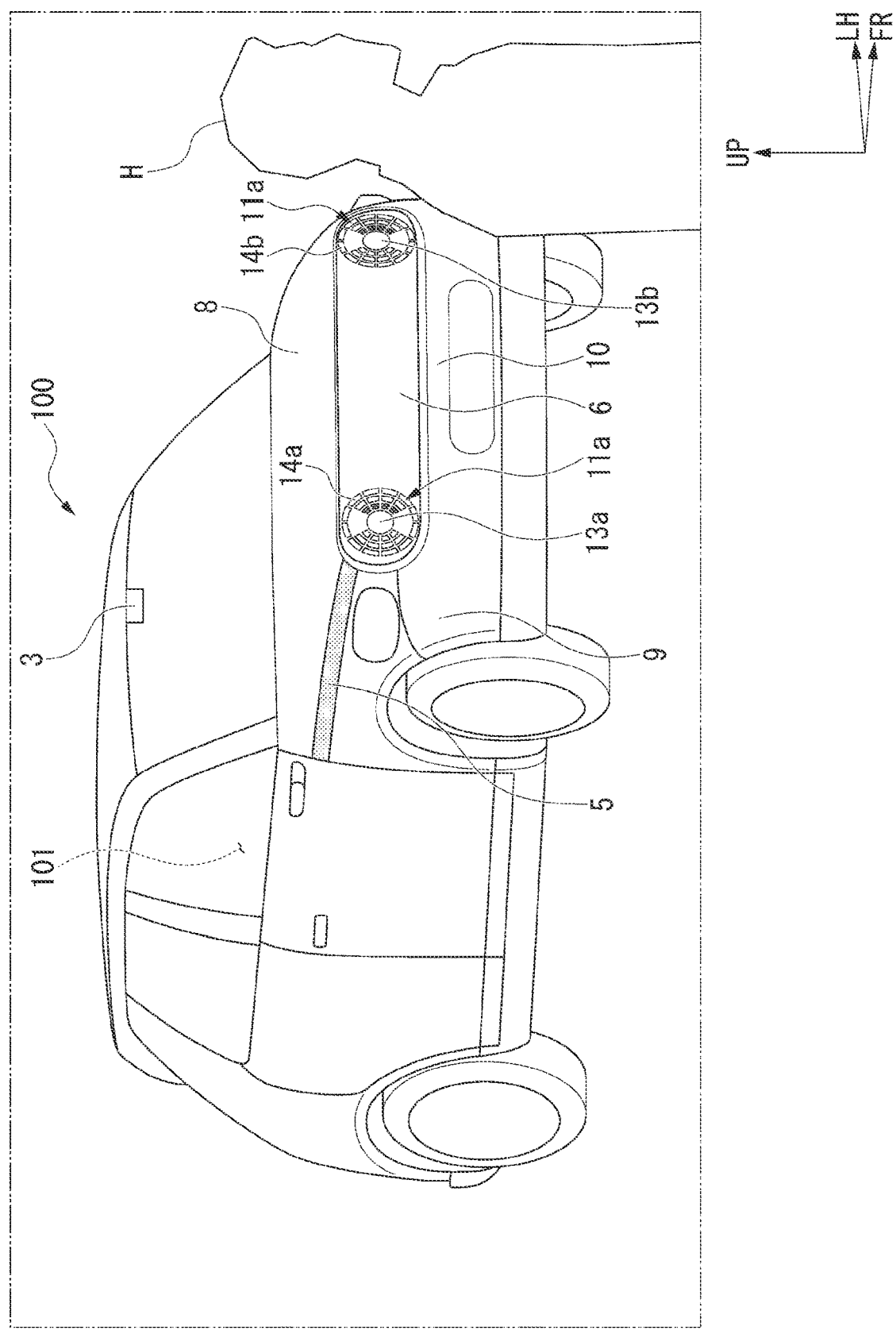
FIG. 13 is a view for describing an example of the display method of the exterior lights and the headlights in the embodiment of the present invention.

Next, as shown in FIG. 13, when the pedestrian H further walks forward, and the pedestrian H moves from the right to the left in front of the vehicle 100, the driver's line of sight is moved to follow the pedestrian H. Then, some of the plurality of state indication lights 14a and 14b of the headlights 11a and 11b corresponding to the driver's line of sight are turned on according thereto. After that, when the pedestrian H passes in front of the vehicle 100, the exterior lights 5 and the state indication lights 14a and 14b are turned off.

Returning to FIG. 8, when determination in step ST210 is "No," i.e., the driver does not recognize the pedestrian H, it is determined whether the vehicle 100 is starting (a behavior of the vehicle 100) (step ST214).

When determination in step ST214 is "Yes," i.e., the vehicle 100 is started, there is a high possibility that the driver will try to cross the pedestrian crossing C without noticing the pedestrian H while the pedestrian H is walking on the pedestrian crossing C. Such a situation is shown in FIG. 14.

Figure 14:
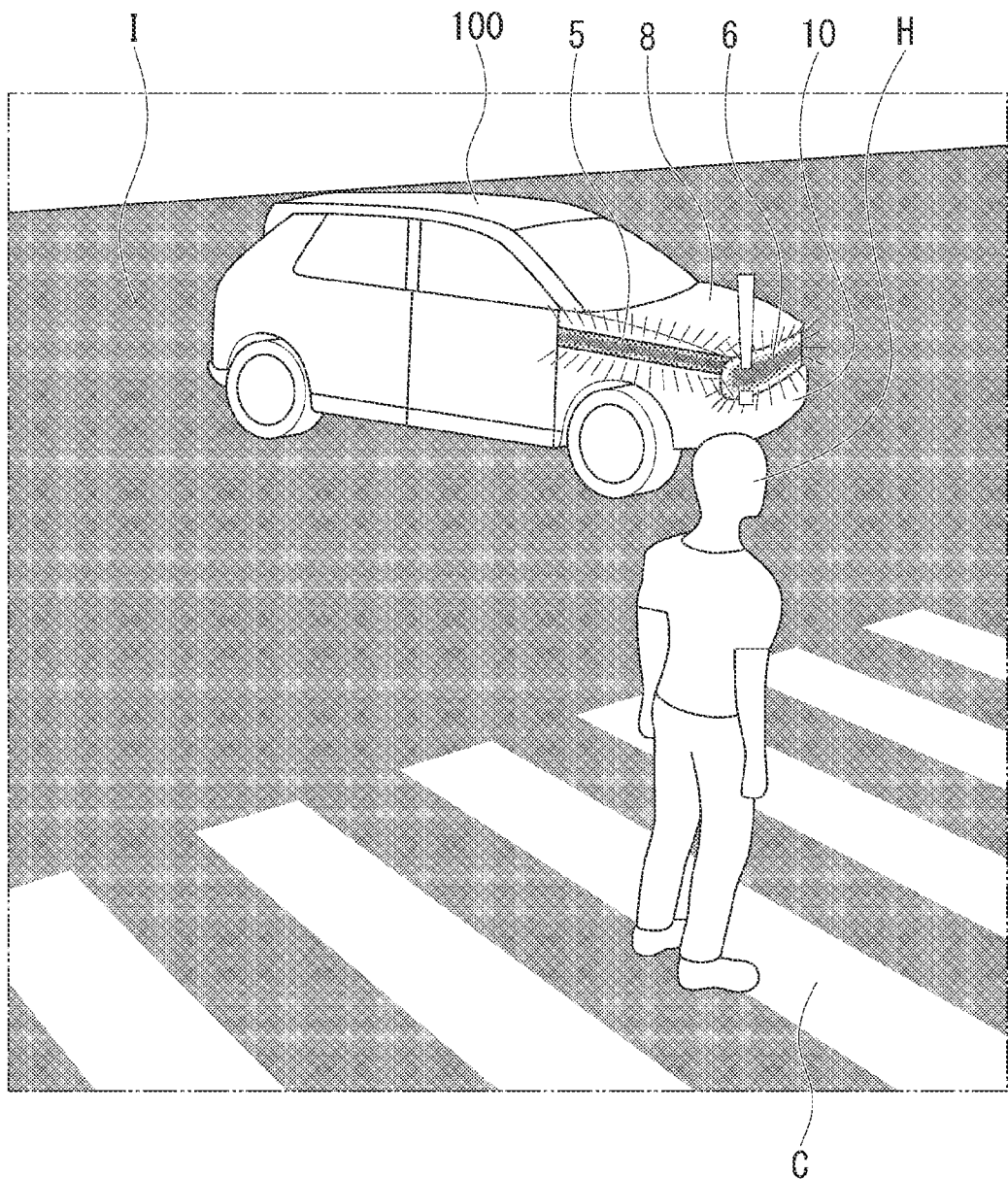
FIG. 14 is a perspective view showing an example of an aspect of a vehicle and a pedestrian on an intersection in the embodiment of the present invention.

FIG. 14 is a view for describing a state in which the driver will try to cross the pedestrian crossing C without noticing the pedestrian H while the pedestrian H is walking on the pedestrian crossing C.

As shown in FIG. 8 and FIG. 14, when determination in step ST214 is "Yes," the exterior lights 5 on the side where the pedestrian H can see (in the case of FIG. 14, a right side) blink rapidly (step ST215 in FIG. 8; hereinafter, may be referred to as second lighting). In addition, the exterior lights 5 at this time are turned on red. The grille light 6 also blinks rapidly. The state indication lights 14a and 14b of the headlights 11a and 11b are turned off.

In this way, a second lit state is made different from the first lit state to notify the pedestrian H that the vehicle 100 may be proceeding (crossing the pedestrian crossing C). The second lit state may be different from the first lit state. It is sufficient if the pedestrian H can be notified. For example, instead of making the exterior lights 5 blink rapidly, only the color may be different from the first lit state. The same applies to the grille light 6, and instead of blinking rapidly, it may be lit in a different color than when driving normally. For example, the state indication lights 14a and 14b of the headlights 11a and 11b may blink rapidly.

Meanwhile, as shown in FIG. 8, when determination in step ST214 is "No," i.e., the vehicle 100 is stopped, determination in step ST210 is performed again. Here, the exterior lights 5, the grille light 6, and the headlights 11a and 11b are turned off. In this way, the second lit state differs on the basis of whether the vehicle 100 is in traveling (in starting) or in a stopped state. In the embodiment, the first lit state and second lit state are different for the exterior lights 5, the grille light 6, and the headlights 11a and 11b. However, there is no limitation thereto, and at least the lighting state of the exterior lights 5 should be different between the first lit state and the second lit state.

Meanwhile, when determination in step ST212 is "No," i.e., the pedestrian H does not recognize the vehicle 100, the controller 4 determines that the driver and the pedestrian H do not recognize each other. Even in this case, it is determined whether the vehicle 100 is starting (a behavior of the vehicle 100) (step ST216).

When determination in step ST216 is "Yes," i.e., the vehicle 100 has started, it proceeds to step ST215.

On the other hand, when determination in step ST216 is "No," i.e., the vehicle 100 is stopped, it proceeds to step ST211.

Meanwhile, when determination in step ST220 is "Yes," i.e., the pedestrian H has recognized the vehicle 100, all the exterior lights 5, the grille light 6, and the state indication lights 14a and 14b of the headlights 11a and 11b are turned off (step ST221).

Next, the controller 4 performs determination of whether the driver has recognized the pedestrian H (step ST222).

When determination in step ST222 is "Yes," i.e., the driver has recognized the pedestrian H, it proceeds to step ST215.

Meanwhile, determination in step ST220 is "No," i.e., the pedestrian H does not recognize the vehicle 100, it is determined whether the vehicle 100 is starting (a behavior of the vehicle 100) (step ST223).

When determination in step ST223 is "Yes," i.e., the vehicle 100 is starting, it proceeds to step ST215.

On the other hand, when determination in step ST223 is "No," i.e., the vehicle 100 is stopped, determination of step ST220 is performed again.

Meanwhile, when determination in step ST222 is "No," i.e., the driver does not recognize the pedestrian H, the controller 4 determines that the driver and the pedestrian H do not recognize each other. Even in this case, it is determined whether the vehicle 100 is starting (a behavior of the vehicle 100) (step ST224).

When determination in step ST224 is "Yes," i.e., the vehicle 100 has started, it proceeds to step ST215.

On the other hand, when determination in step ST224 is "No," i.e., the vehicle 100 is stopped, it proceeds to step ST221.

<Operations of Grille Light or Risk Indicator Between Vehicle and Other Vehicles>

As described above, the example of the display method in the grille light 6 of the vehicle 100 or the example of the display method of the exterior lights 5, the grille light 6, the risk indicator 7 and the headlights 11a and 11b between the vehicle 100 and the pedestrian H has been described. However, even between the vehicles, it is possible to cause both the vehicles to perform the same operations as the exterior lights 5, the grille light 6, the risk indicator 7 and the headlights 11a and 11b described above. Hereinafter, a display method of the exterior lights 5, the grille light 6 and the risk indicator 7 between the vehicle 100 and the motorcycle 103 as another vehicle will be described.

Figure 15:
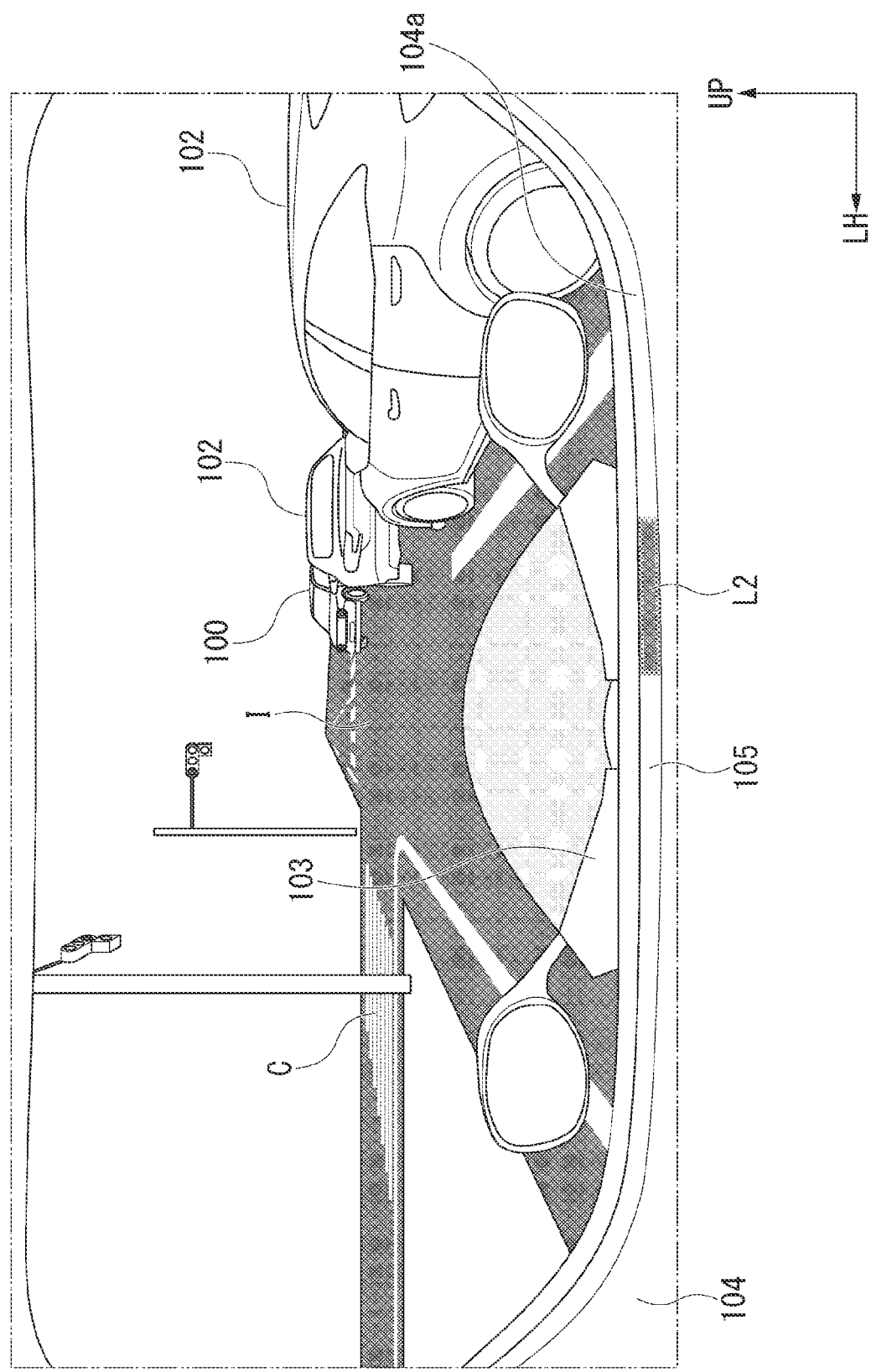
FIG. 15 is a perspective view showing a forward side seen from a driver of a motorcycle in the embodiment of the present invention.

FIG. 15 is a perspective view in which a forward side is seen from a driver of the motorcycle 103. FIG. 15 shows a state in which the above-mentioned state of FIG. 5 is seen from the motorcycle 103 as an example.

As shown in FIG. 15, a risk indicator 105 of the motorcycle 103 is provided on, for example, a lower portion of an opening edge 104a of a helmet 104 worn by the driver. The risk indicator 105 is provided across the entire left and right sides of the opening edge 104a of the helmet 104.

In FIG. 15, a controller (not shown) of the motorcycle 103 turns on a risk mark L2 on a part of the risk indicator 105 on the basis of a signal output from the recognition part 2 (an indicator lighting state). The risk mark L2 is on a straight line connecting the driver and the vehicle 100.

Figure 16:
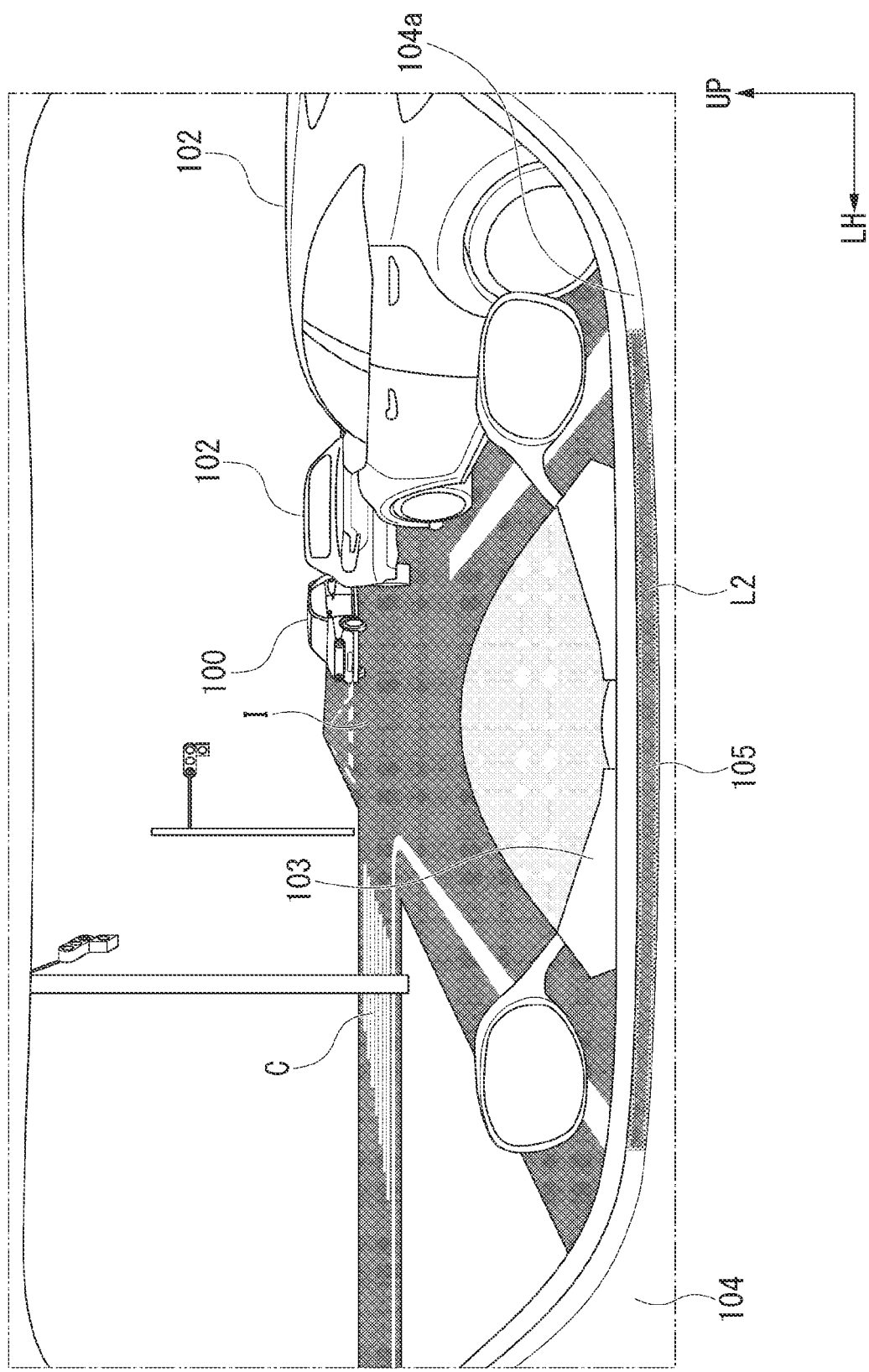
FIG. 16 is a perspective view showing a forward side seen from the driver of the motorcycle in the embodiment of the present invention.

FIG. 16 is a perspective view in which a forward side is seen from the driver of the motorcycle 103, showing a state in which a predetermined amount of time has passed since the point of FIG. 15.

For example, as shown in FIG. 16, when it is determined that the driver of the vehicle 100 does not recognize the motorcycle 103 during traveling of the motorcycle 103, the vehicle 100 may start making a right turn. In this case, the risk indicator 105 is turned on entirely. Accordingly, the driver of the motorcycle 103 is informed that there is a possibility that the vehicle 100 is going to advance (the vehicle 100 may start turning right).

The risk indicator 105 may be sufficient as long as it is possible to recognize that the driver has been notified. For example, the risk indicator 105 may blink rapidly, or the lighting color of the risk indicator 105 may be changed.

Next, specific display timing of the exterior lights 5 and the risk indicator 7 between the vehicle 100 and the motorcycle 103 as another vehicle will be described with reference to FIG. 17 and FIG. 18.

Figure 17:
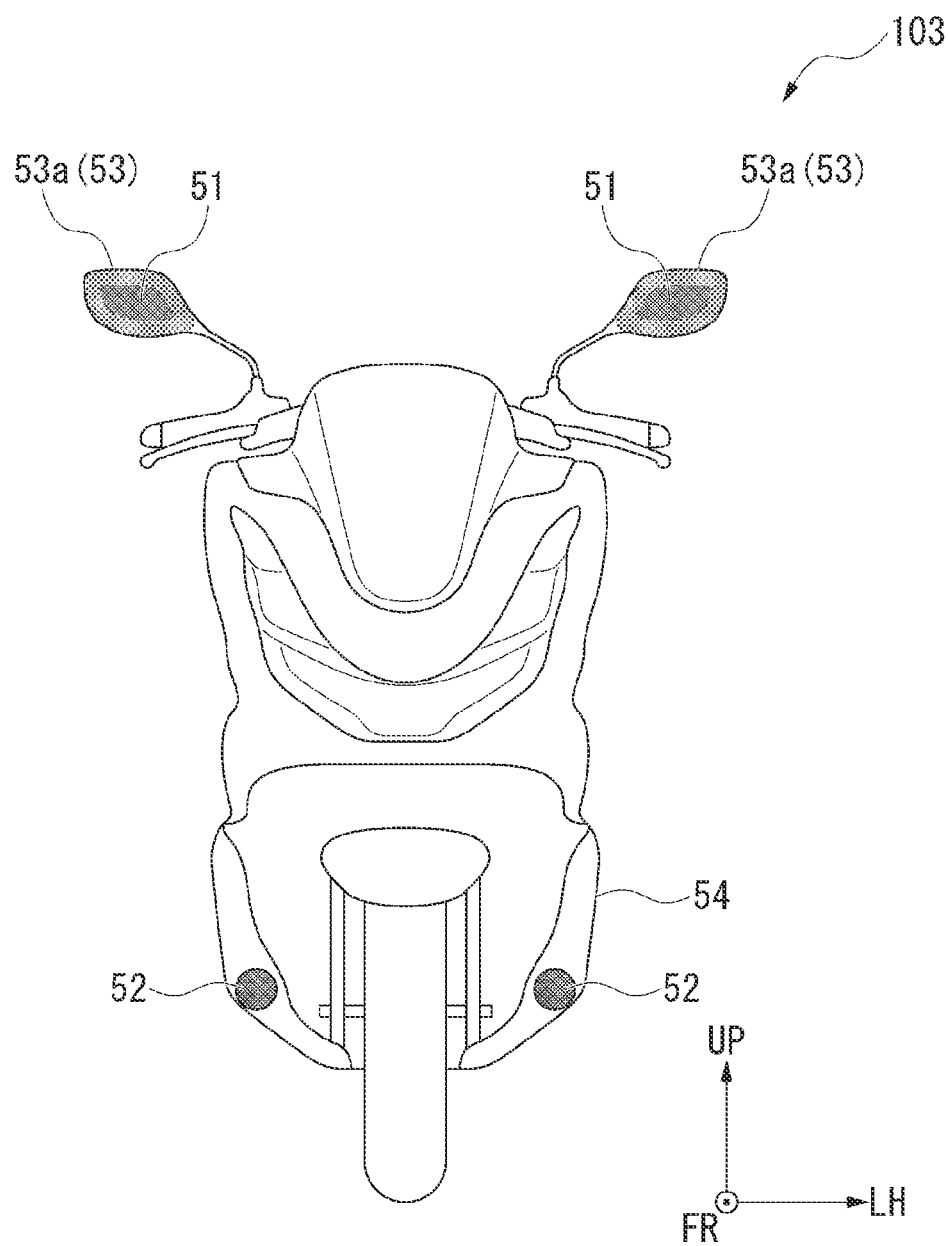
FIG. 17 is a front view showing an example of a motorcycle seen from the front in the embodiment of the present invention.

FIG. 17 is a front view of an example of the motorcycle 103 seen from the front. FIG. 17 shows an example of exterior lights 51 and 52 (upper exterior lights 51 and lower exterior lights 52) provided on a front side of the motorcycle 103.

As shown in FIG. 17, for example, the upper exterior lights 51 and the lower exterior lights 52 are provided on the front side of the motorcycle 103. The upper exterior lights 51 are provided on, for example, front housings 53a of rearview mirrors 53. The lower exterior lights 52 are provided on, for example, a front surface of a front cover 54. A specific display example of each of the exterior lights 51 and 52 will be described below.

FIG. 18 is a table showing specific display timing of the exterior lights 5, 51 and 52, the grille light 6 and the risk indicators 7 and 105 between the vehicle 100 and the motorcycle 103. In the following description, in order to easily distinguish between the vehicle 100 and the other vehicle (the motorcycle 103), the vehicle 100 is referred to as a four-wheeled vehicle, and the motorcycle 103 is referred to as a two-wheeled vehicle.

As shown in FIG. 18, for example, the following four situations are determined, displays of the grille light 6 and the risk indicator 7 of the four-wheeled vehicle (displays on the side of the four-wheeled vehicle) and displays of the exterior lights 51 and 52 and the risk indicator 105 of the two-wheeled vehicle (displays on the side of the two-wheeled vehicle) are changed. The four situations are as follows.

(1) Whether the four-wheeled vehicle has recognized the two-wheeled vehicle?
(2) Whether the two-wheeled vehicle has recognized the four-wheeled vehicle"
(3) Whether the four-wheeled vehicle is starting (stopped)?
(4) Whether the two-wheeled vehicle is trying to stop (not stopped)?

For example, when the four-wheeled vehicle has recognized the two-wheeled vehicle and the two-wheeled vehicle does not recognize the four-wheeled vehicle, and when the four-wheeled vehicle is starting and the two-wheeled vehicle is not stopped (a case of an upper most row of the table shown in FIG. 18), the displays on the side of the four-wheeled vehicle and the displays on the side of the two-wheeled vehicle are as follows. That is, in the displays on the side of the four-wheeled vehicle, the grille light 6 is changed from lights-out to blinking and the risk indicator 7 is turned on. Meanwhile, in the displays on the side of the two-wheeled vehicle, the exterior lights 51 and 52 are changed from lighting to blinking and the risk indicator 105 is turned on.

In the exterior lights 51 and 52 of the two-wheeled vehicle, for example, a lighting color in the first lit state of the lower exterior lights 52 may be green, and a lighting color in the second lit state may be red. The concept of the first lit state and the second lit state of the two-wheeled vehicle is similar to the concept of the first lit state and the second lit state of the four-wheeled vehicle described above. In the exterior lights 51 and 52 of the two-wheeled vehicle, for example, the upper exterior lights 51 may be turned on like the lower exterior lights 52 or may be turned on different colors. Further, the first lit state may be normal lighting, and the second lit state may be rapid blinking.

In this way, by changing the displays on the side of the four-wheeled vehicle and the displays on the side of the two-wheeled vehicle depending on various situations, mutual communication becomes possible.

<Illuminating Device>

Next, an illumination device 50 provided separately from the above-mentioned vehicle 100, the motorcycle 103, or the like, will be described with reference to FIG. 5.

As shown in FIG. 5, for example, the illumination device 50 having the same function as the illumination device for a vehicle 1 configured to allow visual checking by the pedestrian H may be provided on the intersection I or the like. Hereinafter, an example of a specific operation of the illumination device 50 will be described.

That is, information of the detection part 3 of the vehicle 100 or the motorcycle 103 (information of the driver) is transmitted to an external controller (not shown) of the illumination device 50. When the driver of the vehicle 100 has visually recognized the motorcycle 103 and the motorcycle 103 is stopped, a light 50a provided on the illumination device 50 radiates a first emission light pattern L3 onto a road surface. The first emission light pattern L3 is, for example, an emission light pattern extending from the vehicle 100 to the point P. A color of the first emission light pattern L3 is for example, green.

In addition, the illumination device 50 indicates that the driver of the motorcycle 103 has recognized (visually recognized) the vehicle 100. Normally, going straight is often the priority at the intersection I. In such a case, when the motorcycle 103 passes through the intersection I, the light 50a of the illumination device 50 radiates a second emission light pattern LA onto a road surface. The second emission light pattern LA is, for example, an emission light pattern extending from the motorcycle 103 to the point P. A color of the second emission light pattern LA is, for example, yellow. Further, the light 50a of the illumination device 50 irradiates the point P with, for example, a green circle. Irradiation thereof corresponds to the first lit state in the illumination device 50.

On the other hand, the second lit state in the illumination device 50 is as follows. That is, when the vehicle 100 does not recognize (visually recognize) the existence of the motorcycle 103 and has no aspect to stop, the light 50a of the illumination device 50 radiates to the first emission light pattern LA and the point P, for example, in red.

In this way, the above-mentioned illumination device for a vehicle 1 includes the recognition part 2, the detection part 3, and the exterior lights 5. When the recognition part 2 has recognized that the other object (the pedestrian H, the driver of the motorcycle 103, or the like) may be present on an advancing route, and when the detection part 3 detects that the driver has visually recognized the other object, the exterior lights 5 are in the first lit state. On the other hand, when the recognition part 2 has recognized that the other object may be present on (enter) the advancing route, and when the detection part 3 detects that the driver does not visually recognize the other object, the exterior lights 5 are in the second lit state. For this reason, it is possible to inform the other object whether the driver has recognized the other object via the exterior lights 5. Accordingly, the illumination device for a vehicle 1 can communicate between the driver and the other object, and can further improve traffic safety for the vehicle 100 or the other object to contribute to development of a sustainable transportation system.

The plurality of exterior lights 5 are provided along the outer edge of the vehicle 100. In the first lit state, some of the exterior lights 5 are in a different state from the other exterior lights 5 and move according to the movement of the driver's line of sight. For this reason, the trend of the driver's line of sight can be reported to the other object in more detail. Accordingly, closer communication can be achieved between the driver and the other object.

The second lit state in the exterior lights 5 differs on the basis of whether the vehicle 100 is traveling (starting) or stopped. For this reason, it is possible to warn the other object and call his/her attention.

The risk indicator 7 is provided in the passenger compartment 101 of the vehicle 100. When the other object is recognized by the recognition part 2, the risk indicator 7 displays the risk mark L1 on the straight line connecting the driver and the other object. For this reason, it is possible to prompt the driver to visually recognize the other object.

When the risk mark L1 is present in the direction of the driver's line of sight, the exterior lights 5 are in the first lit state. For this reason, more accurate communication can be established between the driver and the other object.

The light 50a of the illumination device 50 radiates onto the point P or another load. For this reason, it is possible to reliably notify the driver's recognition state to the other object, and it is possible to accurately perform communication between the driver and the other object.

The present invention is not limited to the above-mentioned embodiment, and various modifications may be added to the above-mentioned embodiment without departing from the scope of the present invention.

For example, in the above-mentioned embodiment, the case in which communication is established between the driver and the other object by using the first lit state or the second lit state. However, there is no limitation thereto, and a first not-lit state or a second not-lit state may be used instead of the first lit state or the second lit state. The first not-lit state is referred to as, for example, a state in which all the exterior lights 5 are turned on during normal driving, and a state in which a part or all of the exterior lights 5 are turned off under the condition of the above-mentioned first lighting. In addition, the second not-lit state is referred to as from a state in which all the exterior lights 5 are turned on to a state a part of all of the exterior lights 5 are turned off. Here, the first not-lit state and the second not-lit state are made different.

In the above-mentioned embodiment, the case in which the illumination device 50 radiates light in the first lit state or the second lit state toward a road surface has been described. However, there is no limitation thereto, and for example, the light may be radiated to a position in the exterior region of the vehicle 100 where the other object can visually recognize (for example, a position where the exterior lights 5 of the vehicle 100 are provided). With this configuration, communication can be established between the driver and the other object without providing the exterior lights 5 on the vehicle 100 itself.

In the above-mentioned embodiment, the case in which the exterior lights 5, the grille light 6, and the state indication lights 14a and 14b are separately provided on the vehicle 100 and turned on with separate displays has been described. However, there is not limitation thereto, and functions of displaying the first lit state and the second lit state in one light may be combined. In such a case, for example, it is synonymous with the grille light 6, the state indication lights 14a and 14b, or the exterior lights 5.

In the above-mentioned embodiment, the case in which the risk indicator 7 of the vehicle 100 is lengthily provided on the dashboard 12 in the vehicle width direction has been described. The case in which the risk indicator 105 of the helmet 104 is provided across the entire left and right sides of the opening edge 104a has been described. However, there is no limitation thereto, and the risk indicators 7 and 105 may be provided such that the risk marks L1 and L2 can be lit on the driver's line of sight.

In the above-mentioned embodiment, the case in which the plurality of exterior lights 5 of the vehicle 100 are provided along the boundary between the bonnet hood 8 and the front fender 9 has been described. However, there is no limitation thereto, and the exterior lights 5 may be provided in the exterior region (vehicle body surface) of the vehicle 100 at positions where the pedestrian H can be recognized on the left and right sides of the front portion. The exterior lights 5 along the outer edge of the vehicle 100 are not limited to the boundary between the bonnet hood 8 and the front fender 9. The outer edge of the vehicle 100 is a portion of the exterior region that approximates the ridgeline. By arranging the plurality of exterior lights 5 along the portion of the exterior region of the vehicle 100 that becomes the ridgeline as much as possible, the driver's intention (movement of the line of sight) can be more easily reflected in the pedestrian H or the like.

The first lit state or the second lit state is not limited to the above-mentioned embodiment, and various display methods can be adopted. A display method using animation or the like is also possible. It is sufficient that the first lit state and the second lit state are different.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An illumination device for a vehicle comprising:
    a recognition part configured to recognize other object that might be present on an advancing route of a vehicle;
    a detection part configured to detect that a driver of the vehicle has recognized the other object; and
    an exterior light provided at a position in an exterior region of the vehicle which is visible to the other object and configured to be turned on and off,
    wherein, when the recognition part has recognized that there is a possibility that the other object is going to be present on the advancing route and when the detection part has detected that the driver has recognized the other object, the exterior light is brought into either a first lit or first not-lit state,
    when the recognition part has recognized that there is a possibility that the other object is going to be present on the advancing route and when the detection part has detected that the driver has not recognized the other object, the exterior light is brought into either a second lit or second not-lit state, and
    the first lit state and the second lit state are different from each other, and the first not-lit state and the second not-lit state are different from each other.

2. The illumination device for a vehicle according to claim 1, wherein a plurality of exterior lights are provided along outer edges of the vehicle, and
    in either the first lit or first not-lit state, a part of the exterior light is moved according to a movement of driver's line of sight while made in a state which is different from other exterior light.

3. The illumination device for a vehicle according to claim 1, wherein the second lit state of the exterior lights differs on the basis of whether the vehicle is in a traveling state or a stopped state.

4. The illumination device for a vehicle according to claim 1, comprising a risk indicator provided in a passenger compartment of the vehicle,
    wherein the risk indicator displays a risk mark on a straight line connecting the driver and the other object when the recognition part has recognized the other object.

5. The illumination device for a vehicle according to claim 4, wherein the exterior lights becomes in the first lit state when the risk mark is present in a direction of the driver's line of sight.

6. An illumination device comprising:
- a recognition part configured to recognize other object that might be present on an advancing route of a vehicle;
- a detection part configured to detect that a driver of the vehicle has recognized the other object; and
- a light configured to be turned on and off and radiate light to a position which is visible to the other object with respect to the vehicle,
- wherein, when the recognition part has recognized that there is a possibility that the other object is going to be present on the advancing route and when the detection part has detected that the driver has recognized the other object, the light radiates light in a first lit state,
- when the recognition part has recognized that there is a possibility that the other object is going to be present on the advancing route and when the detection part has detected that the driver has not recognize the other object, the light radiates light in a second lit state, and
- the first lit state and the second lit state are different from each other.

7. The illumination device according to claim 6, wherein the light radiates light to a road surface at a position where the vehicle and the other object will cross each other.

8. The illumination device according to claim 6, wherein the light radiates light to a position where the other object can visually recognize in an exterior region of the vehicle.

* * * * *